(12) United States Patent
Davey et al.

(10) Patent No.: US 11,310,207 B1
(45) Date of Patent: Apr. 19, 2022

(54) SYSTEMS AND METHODS FOR EXCHANGING DATA BETWEEN DEVICES

(71) Applicant: SHOPIFY INC., Ottawa (CA)

(72) Inventors: Joshua Davey, Toronto (CA); Jiawei Du, Toronto (CA); Fernando Nogueira, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/128,846

(22) Filed: Dec. 21, 2020

(51) Int. Cl.
*H04L 29/06* (2006.01)
*H04L 9/00* (2022.01)

(52) U.S. Cl.
CPC .......... *H04L 63/0414* (2013.01); *H04L 9/008* (2013.01); *H04L 63/0442* (2013.01); *H04L 63/0478* (2013.01)

(58) Field of Classification Search
CPC .............. H04L 63/0414; H04L 9/008; H04L 63/0442; H04L 63/0478
See application file for complete search history.

(56) References Cited

U.S. PATENT DOCUMENTS

| | | | | |
|---|---|---|---|---|
| 2009/0292677 | A1* | 11/2009 | Kim | G06F 16/958 |
| 2014/0304505 | A1* | 10/2014 | Dawson | H04L 63/0428 713/165 |
| 2017/0111328 | A1* | 4/2017 | Leon | H04L 9/30 |
| 2017/0270567 | A1* | 9/2017 | Sohn | G06Q 30/0269 |
| 2019/0109821 | A1* | 4/2019 | Clark | H04L 63/0272 |
| 2021/0266346 | A1* | 8/2021 | Gordon | H04L 63/0428 |

FOREIGN PATENT DOCUMENTS

| | | | | |
|---|---|---|---|---|
| AU | 2013289036 B2 | * | 8/2018 | ......... G06Q 30/0241 |
| WO | WO-2014149608 A1 | * | 9/2014 | ............. G06Q 30/02 |

OTHER PUBLICATIONS

Liu et al., "Cyber Security and Privacy Issues in Smart Grids", IEEE Communications Surveys & Tutorials, vol. 14, Issue: 4, Fourth Quarter (Year: 2012).*
A. Menezes, P. van Oorschot, and S. Vanstone (1997). "Public-Key Encryption". Chapter 8, Section 8.2 of the Handbook of Applied Cryptography, CRC Press, Inc, pp. 283-319.
Adi Shamir, Ronald L. Rivest, and Leonard M. Adleman (1981). "Mental Poker". The Mathematical Gardner, Springer, pp. 37-43.
Frederik Armknecht, Colin Boyd, Christoper Carr, Kristian Gjøsteen, Angela Jäschke, Christian Reuter, and Martin Strand (2015). "A Guide to Fully Homomorphic Encryption." IACR Cryptol. ePrint Arch. 2015, 1192, pp. 1-35.

(Continued)

*Primary Examiner* — Morshed Mehedi

(57) ABSTRACT

System and methods are provided to facilitate the exchange of user data between two parties, but limit the exchange of user data to users that are known to both parties. According to an embodiment, encrypted first user data is transmitted from a first device to a second device. The second device then transmits intersection data to the first device, where the intersection data is based on the encrypted first user data and second user data. The intersection data may be decrypted by the first device and the first device may determine, based on the decrypted intersection data, that one or more users are common to the both the first device and the second device. The first and second devices may then exchange data pertaining to the common users.

24 Claims, 11 Drawing Sheets

(56) References Cited

OTHER PUBLICATIONS

Craig Gentry (2009). "Fully homomorphic encryption using ideal lattices". Proceedings of the forty-first annual ACM Symposium on Theory of Computing (STOC '09). Association for Computing Machinery, New York, NY, USA, pp. 169-178. DOI:https://doi.org/10.1145/1536414.1536440.

Craig Gentry and Shai Halevi (2010). "Implementing Gentry's fully-homomorphic encryption scheme". Cryptology ePrint Archive, Report 2010/520.

Marten van Dijk, Craig Gentry, Shai Halevi and Vinod Vaikuntanathan (2009). "Fully Homomorphic Encryption over the Integers". Cryptology ePrint Archive, Report 2009/616.

Jean-Sebastien Coron, David Naccache and Mehdi Tibouchi (2011). "Public Key Compression and Modulus Switching for Fully Homomorphic Encryption over the Integers". Cryptology ePrint Archive, Report 2011/440.

Jean-Sébastien Coron, Avradip Mandal, David Naccache and Mehdi Tibouchi (2011). "Fully Homomorphic Encryption over the Integers with Shorter Public Keys". Rogaway P. (eds) Advances in Cryptology—CRYPTO 2011, pp. 487-504. Lecture Notes in Computer Science, vol. 6841. Springer, Berlin, Heidelberg. https://doi.org/10.1007/978-3-642-22792-9_28.

Jean-Sébastien Coron, Tancrède Lepoint and Mehdi Tibouchi (2013). "Batch Fully Homomorphic Encryption over the Integers". Cryptology ePrint Archive, Report 2013/03.

Jean-Sébastien Coron, Tancrède Lepoint and Mehdi Tibouchi (2014). "Scale-Invariant Fully Homomorphic Encryption over the Integers". Cryptology ePrint Archive, Report 2014/032.

Zvika Brakerski, Craig Gentry and Vinod Vaikuntanathan (2011). "Fully Homomorphic Encryption without Bootstrapping". Cryptology ePrint Archive, Report 2011/277.

Zvika Brakerski and Vinod Vaikuntanathan (2011). "Efficient Fully Homomorphic Encryption from (Standard) LWE". Cryptology ePrint Archive, Report 2011/344.

Adriana Lopez-Alt, Eran Tromer and Vinod Vaikuntanathan (2012). "On-the-Fly Multiparty Computation on the Cloud via Multikey Fully Homomorphic Encryption". Cryptology ePrint Archive, Report 2013/094.

Junfeng Fan and Frederik Vercauteren (2012). "Somewhat Practical Fully Homomorphic Encryption". Cryptology ePrint Archive, Report 2012/144.

Zvika Brakerski (2012). "Fully Homomorphic Encryption without Modulus Switching from Classical GapSVP". Cryptology ePrint Archive, Report 2012/07.

Joppe W. Bos, Kristin Lauter, Jake Loftus and Michael Naehrig (2013). "Improved Security for a Ring-Based Fully Homomorphic Encryption Scheme". Cryptology ePrint Archive, Report 2013/07.

Jung Hee Cheon, Andrey Kim, Miran Kim and Yongsoo Song (2017). "Homomorphic encryption for arithmetic of approximate numbers". Takagi T., Peyrin T. (eds) Advances in Cryptology—ASIACRYPT 2017. ASIACRYPT 2017. Springer, Cham, pp. 409-437.

Craig Gentry, Shai Halevi and Nigel P. Smart (2011). "Fully Homomorphic Encryption with Polylog Overhead". Cryptology ePrint Archive, Report 2011/566.

Craig Gentry, Shai Halevi and Nigel P. Smart (2011). Better Bootstrapping in Fully Homomorphic Encryption. Cryptology ePrint Archive, Report 2011/680.

Craig Gentry, Shai Halevi and Nigel P. Smart (2012). "Homomorphic Evaluation of the AES Circuit". Cryptology ePrint Archive, Report 2012/099.

Craig Gentry, Amit Sahai and Brent Waters (2013). "Homomorphic Encryption from Learning with Errors: Conceptually-Simpler, Asymptotically-Faster, Attribute-Based". Cryptology ePrint Archive, Report 2013/340.

Zvika Brakerski and Vinod Vaikuntanathan (2013). "Lattice-Based FHE as Secure as PKE". Cryptology ePrint Archive, Report 2013/541.

Benny Pinkas (2017). "Private Set Intersection". Secure Computation and Efficiency, Bar-Ilan University, Israel. Retrieved from https://cyber.biu.ac.il/wp-content/uploads/2017/01/15.pdf. Accessed on Jan. 4, 2021.

Cornelius Ihle, Moritz Schubotz, Norman Meuschke and Bela Gipp (2020). "A First Step Towards Content Protecting Plagiarism Detection". In: Proceedings of the ACM/IEEE Joint Conference on Digital Libraries (JCDL). DOI 10.1145/3383583.3398620.

Hao Chen, Kim Laine, and Peter Rindal. (2017). "Fast Private Set Intersection from Homomorphic Encryption". Cryptology ePrint Archive, Report 2017/299.

Hott, Robbie. (2012). "Fully Homomorphic SIMD Operations". 59 slides. Retrieved from https://www.cs.virginia.edu/~jh2jf/classes/spring2012/crypto/presentation2.pdf. Accessed on Jan. 4, 2021.

Kurt Thomas, Jennifer Pullman, Kevin Yeo, Ananth Raghunathan, Patrick Gage Kelley, Luca Invernizzi, Borbala Benko, Tadek Pietraszek, Sarvar Patel, Dan Boneh and Elie Bursztein. (2019). "Protecting accounts from credential stuffing with password breach alerting". In: Proceedings of the 28th USENIX Security Symposium, Santa Clara, CA, USA, pp. 1555-1571.

\* cited by examiner

| E-Commerce Platform | Q Search | | JG John's Apparel Jonny B. Good |
|---|---|---|---|
| ⌂ Home | Good afternoon, Jonny B.. | | All channels ⌄   Today ⌄ |
| ⇄ Orders | Here's what's happening with your store today. | | |
| ⌕ Products | | | TOTAL SALES Jun 1 |
| ○ Customers | Today's total sales    Today's visits | | $98.00             2 orders |
| ⌸ Reports | $98.00                        1 | | $125 |
| ⚙ Discounts | | | $75 |
| ⊞ Apps | ● Update your Platform Payments tax details | | $25 |
| | We require additional information to verify your identity. | | 12am    8pm  4pm  11pm |
| SALES CHANNELS  ⊕ | Update tax details | | TOTAL SALES BY CHANNEL View dashboard |
| 🏠 Online Store  ◈ | ● Advanced Cash on Delivery has been deactivated for your store | | Online Store      0 orders |
| ▢ Mobile App | See why | | $0.00 |
| View all channels | | | Mobile app |
| | | | $0.00              0 orders |
| | | | Shopify POS (126 York St.) |
| ⚙ Settings | | | $0.00              0 orders |

| Indices 602 | First User Identifiers 604 | Short Identifiers 606 |
|---|---|---|
| 1-1 | john.smith@email.com | jo@email.com |
| 1-2 | other.user@email.com | ot@email.com |
| 1-3 | additional.user@email.com | ad@email.com |

| Decrypted Intersection Data 702 |
|---|
| 1o9CRMJa |
| 8QWJ2IGm |
| iGCSKQtW |
| |
| |

| Indices 704 | Short Identifiers 706 | Encrypted Second User Identifiers 708 |
|---|---|---|
| 2-1 | jo@email.com | MQTs15Yg |
| 2-2 | jo@email.com | 1o9CRMJa |
| 2-3 | ot@email.com | NEukriT9 |
| 2-4 | ad@email.com | iGCSKQtW |
| 2-5 | ad@email.com | zZryPogB |

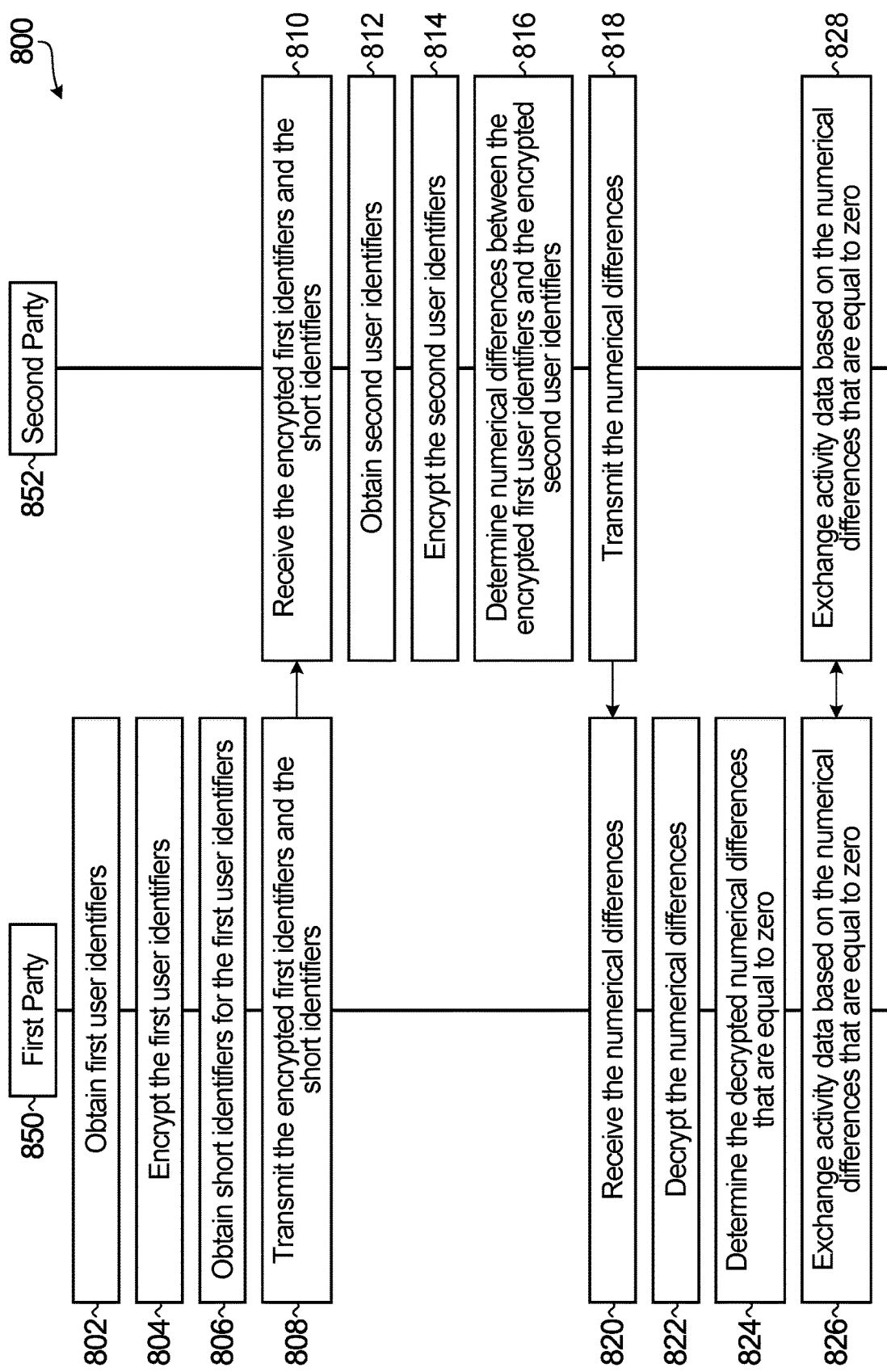

SYSTEMS AND METHODS FOR EXCHANGING DATA BETWEEN DEVICES

FIELD

The present application relates to encrypted data exchange, and more particularly, to exchange of user data between devices using encryption.

BACKGROUND

Cryptography is often implemented to securely exchange data or information between different devices. For example, data may be encrypted prior to transmission between different devices to hinder eavesdropping and/or tampering by adverse parties. However, in some cases, maintaining privacy and confidentiality during data exchange remains a challenge.

SUMMARY

Computing platforms (such as e-commerce platforms, social media platforms and the like) often store data sets pertaining to the users of those platforms. While the exchange of user data sets between computing platforms may be beneficial in some cases, it may come at the cost of user privacy. A need exists for systems and methods to help facilitate the exchange of user data while maintaining user privacy.

Some embodiments of the present disclosure relate to determining one or more users that are common to different computing platforms. Once the common users are determined, the different computing platforms may exchange data pertaining to those users. Consider a case in which a user has an account with a first computing platform (for example, an e-commerce platform) and with a second computing platform (for example, a social media platform). Data pertaining to this user may be stored by both the first and second computing platforms. In this way, the user may be known and common to both computing platforms. However, the first computing platform might not know that the user has an account with the second computing platform, and vice versa.

Although the first computing platform could send the second computing platform a readable or decipherable identifier of the user to inquire whether that user is known to the second computing platform, this action might constitute an undesirable disclosure of user data. For example, sending the name of a user to a computing platform that is not aware of that user's existence could compromise the privacy of the user. Therefore, in some embodiments of the present disclosure, encryption is implemented to exchange and compare user identifiers between different computing platforms. Non-limiting examples of encryption that may be implemented include commutative encryption and homomorphic encryption. Once the first and second computing platforms have identified one or more common users, data pertaining to these users may be exchanged between the computing platforms.

According to an aspect of the present disclosure, there is provided a computer-implemented method that may be performed to exchange user data with a device. This device may be implemented by, or otherwise associated with, a computing platform that collects and stores user data. The method may include encrypting first user data with a first key to obtain encrypted first user data corresponding to a first set of users, and transmitting the encrypted first user data to the device. The method may also include receiving intersection data from the device and decrypting at least some of the intersection data with the first key or a second key to obtain decrypted intersection data. In some embodiments, the intersection data is based on the encrypted first user data and second user data corresponding to a second set of users. The method may further include determining, based on the decrypted intersection data, an overlap between at least some of the first user data and at least some of the second user data. The overlap may correspond to users that are in both of the first set of users and the second set of users. The method may then include exchanging activity data with the device corresponding to the users that are in both of the first set of users and the second set of users.

In some embodiments, determining the overlap between the at least some of the first user data and the at least some of the second user data includes determining that an identifier of a user is in the first user data and in the second user data. The activity data exchanged with the device may include personal information corresponding to this user, such as a record of digital advertising presented to the user, for example.

In some embodiments, at least one of the first user data and the second user data includes an identifier of a user and padding data. The padding data may include fake identifiers of non-existent users and/or random strings to help improve the security of the first/second user data.

In some embodiments, the method further includes transmitting at least one short identifier of the first user data to the device. The second user data may be associated with the at least one short identifier. For example, the second set of users may be selected based, at least in part, on the at least one short identifier, which may improve the efficiency of the method.

In some embodiments, encrypting the first user data with the first key to obtain the encrypted first user data includes homomorphically encrypting the first user data with the first key to obtain the encrypted first user data. In these embodiments, the intersection data may be based on a difference between the encrypted first user data and encrypted second user data, the encrypted second user data corresponding to the second user data encrypted with the first key. Further, determining the overlap between the at least some of the first user data and the at least some of the second user data may include determining that the difference equals zero.

In some embodiments, encrypting the first user data with the first key to obtain the encrypted first user data includes commutatively encrypting the first user data with the first key to obtain the encrypted first user data. In these embodiments, the intersection data may be based on double-encrypted first user data and encrypted second user data, the double-encrypted first user data corresponding to the encrypted first user data further encrypted with a third key, and the encrypted second user data corresponding to the second user data encrypted with the third key. Further, decrypting the at least some of the intersection data with the second key to obtain the decrypted intersection data may include decrypting the double-encrypted first user data with the second key to obtain the decrypted intersection data. Determining the overlap between the at least some of the first user data and the at least some of the second user data could then include determining an overlap between the decrypted intersection data and the encrypted second user data.

According to another aspect of the present disclosure, there is provided a computer-implemented method including receiving encrypted first user data from a device. The encrypted first user data may correspond to first user data encrypted with a key, and the first user data may correspond to a first set of users. The method also includes obtaining second user data corresponding to a second set of users and encrypting the second user data to obtain encrypted second user data. Further, the method may include transmitting intersection data to the device, the intersection data based on the encrypted first user data and the encrypted second user data. In some embodiments, the method also includes exchanging activity data with the device corresponding to the users that are in both of the first set of users and the second set of users.

According to yet another aspect of the present disclosure, there is provided a system including memory to store first user data corresponding to a first set of users. The system also includes at least one processor to: encrypt the first user data with a first key to obtain encrypted first user data transmit the encrypted first user data to a device; receive intersection data from the device, the intersection data based on the encrypted first user data and second user data corresponding to a second set of users; decrypt at least some of the intersection data with a second key to obtain decrypted intersection data; determine, based on the decrypted intersection data, an overlap between at least some of the first user data and at least some of the second user data, the overlap corresponding to users that are in both of the first set of users and the second set of users; and exchange activity data with the device corresponding to the users that are in both of the first set of users and the second set of users. At least one of the first user data and the second user data may include an identifier of a user and padding data.

In some embodiments, the overlap includes an identifier of a user that is in the first user data and in the second user data, and the activity data includes personal information corresponding to the user. For example, the activity data may include a record of digital advertising presented to the user.

In some embodiments, the at least one processor is to homomorphically encrypt the first user data with the first key to obtain the encrypted first user data. Here, the intersection data may be based on a difference between the encrypted first user data and encrypted second user data, where the encrypted second user data corresponds to the second user data encrypted with the first key. The at least one processor may be further to determine the overlap based on the difference being equal to zero.

In some embodiments, the at least one processor is further to transmit at least one short identifier of the first user data to the device, where the second user data is associated with the at least one short identifier.

In some embodiments, the at least one processor is to commutatively encrypt the first user data with the first key to obtain the encrypted first user data. Here, the intersection data may be based on double-encrypted first user data and encrypted second user data, the double-encrypted first user data corresponding to the encrypted first user data further encrypted with a third key, and the encrypted second user data corresponding to the second user data encrypted with the third key. The at least one processor may be further to: decrypt the double-encrypted first user data with the second key to obtain the decrypted intersection data; and determine the overlap between the at least some of the first user data and the at least some of the second user data based on an overlap between the decrypted intersection data and the encrypted second user data.

According to a further aspect of the present disclosure, there is a system including memory to store second user data corresponding to a second set of users and at least one processor. The at least one processor is to: receive encrypted first user data from a device, the encrypted first user data corresponding to first user data encrypted with a key and the first user data corresponding to a first set of users; encrypt the second user data to obtain encrypted second user data; transmit intersection data to the device, the intersection data based on the encrypted first user data and the encrypted second user data; and exchange activity data with the device corresponding to the users that are in both of the first set of users and the second set of users.

According to another aspect of the present disclosure, there is provided a non-transitory computer readable medium storing computer executable instructions which, when executed by a computer, cause the computer to perform a method. The method may include encrypting first user data with a first key to obtain encrypted first user data corresponding to a first set of users and transmitting the encrypted first user data to a device. The method may also include receiving intersection data from the device, the intersection data based on the encrypted first user data and second user data corresponding to a second set of users. The method may then include decrypting at least some of the intersection data with a second key to obtain decrypted intersection data, and determining, based on the decrypted intersection data, an overlap between at least some of the first user data and at least some of the second user data, the overlap corresponding to users that are in both of the first set of users and the second set of users. Further, the method may include exchanging activity data with the device corresponding to the users that are in both of the first set of users and the second set of users.

According to yet another aspect of the present disclosure, there is provided a non-transitory computer readable medium storing computer executable instructions which, when executed by a computer, cause the computer to perform a method. The method may include receiving encrypted first user data from a device, the encrypted first user data corresponding to first user data encrypted with a key and the first user data corresponding to a first set of users. The method may further include obtaining second user data corresponding to a second set of users; encrypting the second user data to obtain encrypted second user data; and transmitting intersection data to the device, the intersection data based on the encrypted first user data and the encrypted second user data. The method may further include exchanging activity data with the device corresponding to the users that are in both of the first set of users and the second set of users.

BRIEF DESCRIPTION OF THE DRAWINGS

Embodiments will be described, by way of example only, with reference to the accompanying figures wherein:

FIG. 2 is an example of a home page of an administrator, according to one embodiment;

FIG. 7 illustrates a table including the first user identifiers and the short identifiers of FIG. 6, as well as decrypted intersection data, short identifiers for the second set of users and encrypted second user identifiers for the second set of users;

FIG. 8 is a flow diagram illustrating a process for exchanging user data between a first party and a second party, according to another embodiment;

DETAILED DESCRIPTION

For illustrative purposes, specific example embodiments will now be explained in greater detail below in conjunction with the figures.

Example e-Commerce Platform

In some embodiments, the methods disclosed herein may be performed on or in association with a commerce platform, though this is by no means required, and, in some embodiments, the subject-matter of the present application may be implemented without a commerce platform. A commerce platform may be referred to as an e-commerce platform. An example of an e-commerce platform will now be described.

Figure 1:
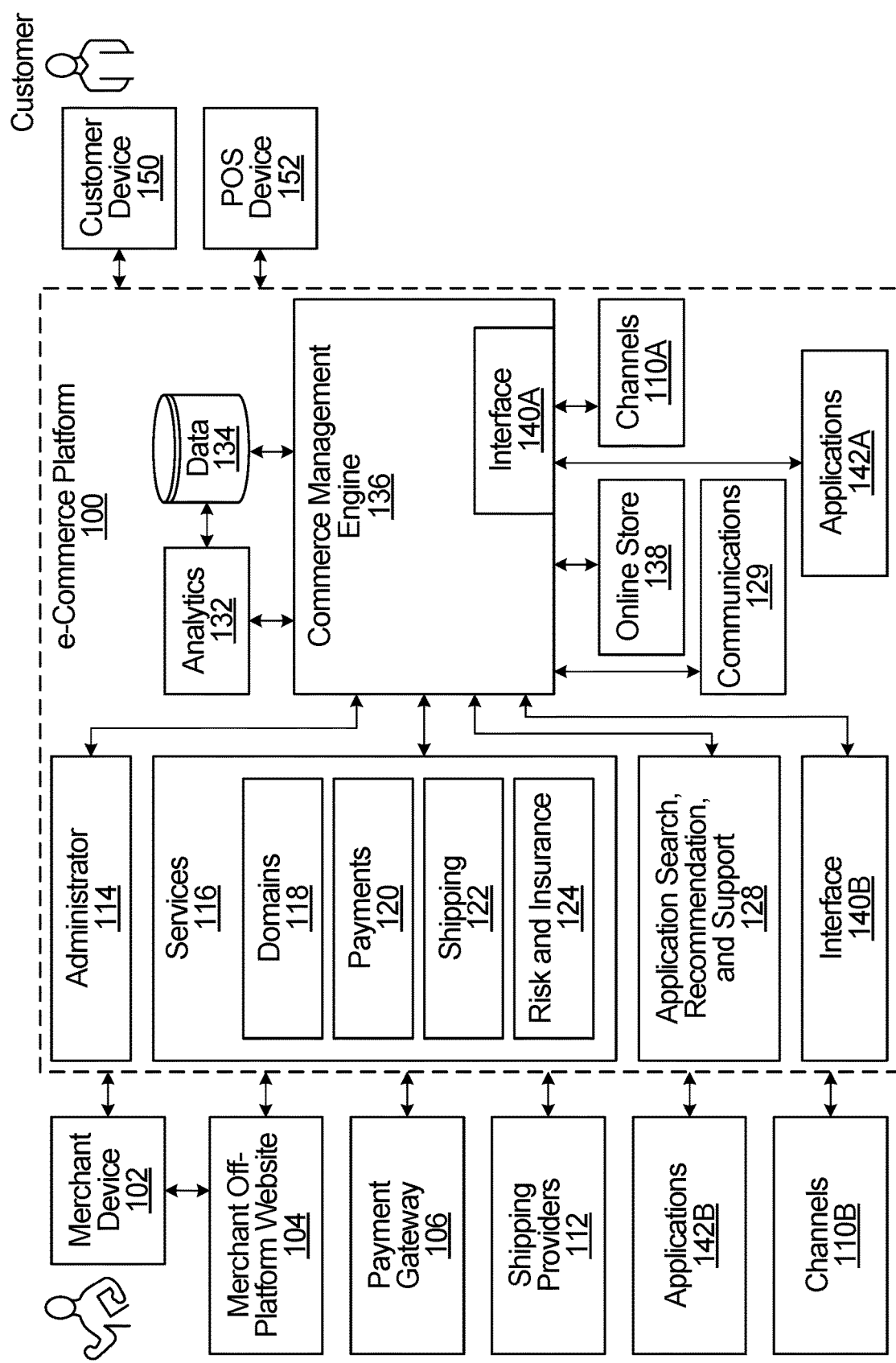
FIG. 1 is a block diagram of an example e-commerce platform, according to one embodiment.

FIG. 1 illustrates an e-commerce platform 100, according to one embodiment. The e-commerce platform 100 may be used to provide merchant products and services to customers. While the example e-commerce platform contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Data Exchange at an e-Commerce Platform

Figure 3:
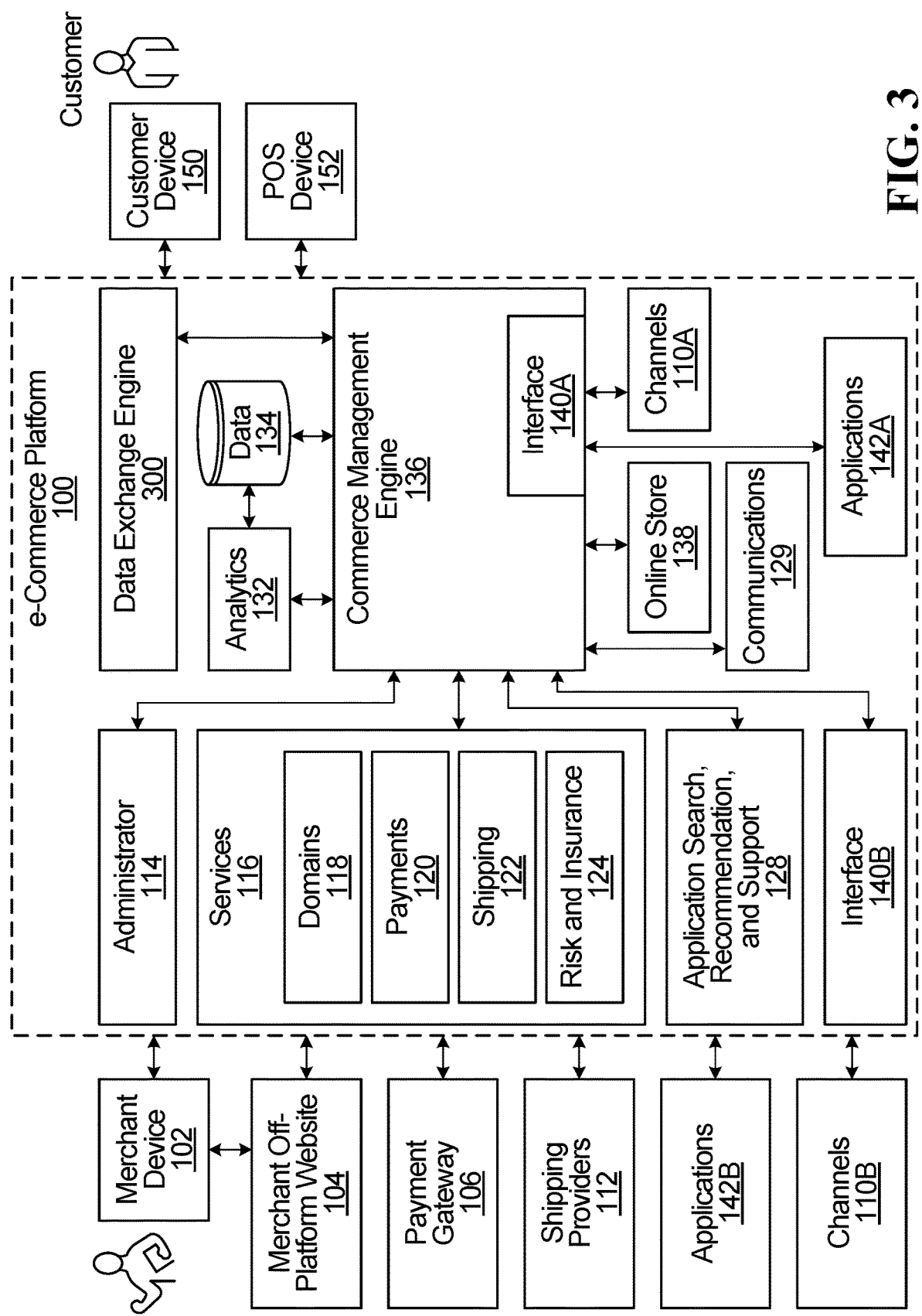
FIG. 3 illustrates the example e-commerce platform of FIG. 1, but including a data exchange engine.

FIG. 3 illustrates the e-commerce platform 100 of FIG. 1, but including a data exchange engine 300. The data exchange engine 300 is an example of a computer-implemented device or system to control, manage, facilitate, organize and/or implement data exchange between the e-commerce platform 100 and other parties. Exchanging data may include transmitting data, receiving data, or both transmitting and receiving data.

As used herein, a party may include an individual, organization, company and/or corporation, for example. In some implementations, a party owns, operates or is otherwise associated with a device, system and/or computing platform that provides products and/or services to users. By way of example, the e-commerce platform 100 may be considered a computing platform that is owned and operated by a particular party.

In some embodiments, data that is exchanged using the data exchange engine 300 may be or include user data. This user data may be stored in the data facility 134, for example. The data exchange engine 300 may control the exchange of user data to help avoid the unnecessary disclosure of user data to another party, which may help protect user privacy. For example, privacy restrictions implemented by the e-commerce platform 100 may limit what user data can be shared and/or which parties user data can be shared with. Privacy restrictions may be imposed or defined by users (for example, based on the privacy settings users select through their account on the e-commerce platform 100), by the e-commerce platform 100 (for example, based on the privacy policies of the e-commerce platform 100) and/or by government regulations. As discussed in further detail elsewhere herein, the data exchange engine 300 may implement encryption to control the exchange of user data.

Although the data exchange engine 300 is illustrated as a distinct component of the e-commerce platform 100 in FIG. 3, this is only an example. A data exchange engine could also or instead be provided by another component of the e-commerce platform 100 or be offered as a stand-alone component or service that is external to the e-commerce platform 100. The e-commerce platform 100 could include multiple data exchange engines that are provided by one or more parties. The multiple data exchange engines could be implemented in the same way, in similar ways and/or in distinct ways. In addition, at least a portion of a data exchange engine could be implemented on a user device. For example, the merchant device 102 could store and run a data exchange engine locally as a software application to help control the exchange of data.

The data exchange engine 300 could implement at least some of the functionality described herein. Although the embodiments described below may be implemented in association with an e-commerce platform, such as (but not limited to) the e-commerce platform 100, the embodiments described below are not limited to the specific e-commerce platform 100 of FIGS. 1 to 3. Further, the embodiments described herein do not necessarily need to be implemented in association with or involve an e-commerce platform at all.

Other computing platforms could implement the systems and methods disclosed herein. Examples of such computing platforms include social media platforms, search engines, healthcare platforms, email platforms and banking platforms, to name but a few.

Data Exchange Using Private Set Intersection

Private set intersection is a computation technique that allows a first party and a second party to securely compare confidential data sets. For example, a data set held by the first party may include a certain data entry, and the first party may want to know if a data set held by the second party includes that same entry. However, to avoid disclosing their confidential data set, the first party might not want to send a readable or decipherable version of that entry to the second party for a direct comparison. Encryption may therefore be employed to perform the comparison while maintaining confidentiality for both parties.

In some cases, two parties may wish to share user data for users that are known or common to each party. For example, each party may have a data set that includes user data pertaining to a particular user, and each party may benefit from obtaining further user data pertaining to the user from the other party. However, before user data for this user is shared, private set intersection may be performed to determine that each party's data set includes user data for the user. In other words, one party may only want to share user data pertaining to a user that the other party is already aware of. This may avoid unnecessarily sharing the identity and/or other personal information of users.

Consider a case in which an online store and a social media platform each have a respective data set including user data pertaining to multiple users. The online store's data set may include a record of user purchases through the online store, and the social media platform's data set may include a record of the digital advertising presented to users through the social media platform. The merchant of the online store could benefit from obtaining at least a portion of the social media platform's data set, and/or vice versa. For example, the online store may pay for digital advertising on the social media platform. When the online store receives an order from a new customer, the merchant might want to know if that customer was presented their advertisements through the social media platform. This could aid in the calculation of advertising conversion and attribution metrics, for example. While hypertext transfer protocol (HTTP) cookies might be used to determine some advertisements that were presented to the customer on the social media platform, cookies are typically not tracked across multiple devices and therefore might not provide a complete record of the advertisements presented to the customer.

If the customer is a user of the social media platform, then the online store could share the identity of the customer with the social media platform without sharing any user data that the social media platform does not already know about. The social media platform may then share a record of the online store's digital advertisements that were presented to the customer through the social media platform. However, if the customer is not a user of the social media platform, then querying the social media platform for a record of any advertisements presented to the customer might unnecessarily share user data for that customer. For example, providing the name or email address of the customer with the social media platform may constitute sharing user data with the social media platform. Accordingly, private set intersection methods may first be implemented to determine if the customer is a user of the social media platform, without disclosing any personal information pertaining to the customer.

Some embodiments of the present disclosure provide systems and methods for sharing user data between two parties with confidential user data sets. Each party may encrypt their user data set before sending it to the other party. The user data sets may include identifiers of one or more users, which allows the common users known to each party to be determined. The parties are not able to directly decrypt each other's user data sets, and therefore the identifiers included in the user data sets remain confidential. However, one or both of the parties may use the encrypted user data sets to identify the common users that are known to each party. Once the common users are identified, user data pertaining to the common users may be exchanged between the two parties.

Encrypted data that is used to identify common users known to multiple parties may be referred to as "intersection data". As used herein, intersection data is based on encrypted user data obtained from multiple parties. No single party can decrypt the intersection data and read the user data obtained from another party. However, the intersection data does allow at least one party to determine the commonalities or overlap between the user data obtained from two or more parties. This overlap may provide the identity of common users known to the parties, while the identity of users that are not known to a party remain confidential. In this way, intersection data may indicate the commonalities between multiple user data sets while maintaining the confidentiality of the user data sets.

Example Systems for Data Exchange

Figure 4:
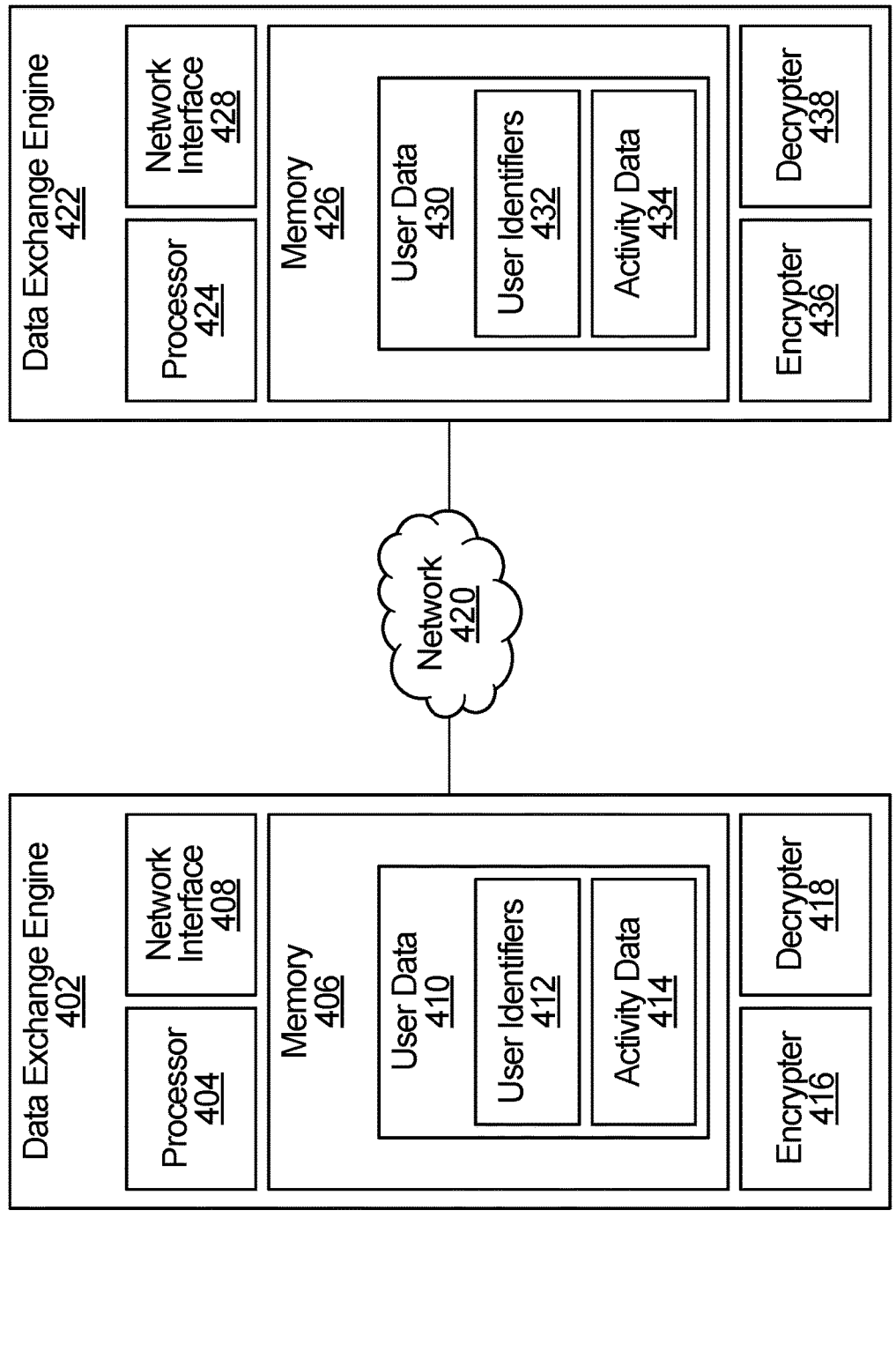
FIG. 4 is a block diagram illustrating a system for exchanging data between two parties, according to an embodiment.

FIG. 4 is a block diagram illustrating a system 400 for exchanging data between two parties, according to an embodiment. The system 400 includes two data exchange engines 402, 422 and a network 420.

The data exchange engines 402, 422 may be devices that are associated with respective parties interested in exchanging data with each other and/or with other parties. Computing platforms owned and/or operated by the respective parties may host, implement and/or use the data exchange engines 402, 422 to facilitate this exchange of data. In one example, the data exchange engines 402, 422 correspond to an online store and a social media platform, respectively, that are interested in exchanging digital advertising data. In another example, the data exchange engines 402, 422 correspond to two health care platforms that are interested in exchanging medical data. In yet another example, the data exchange engines 402, 422 correspond to a banking platform and a government agency, respectively, that are interested in exchanging financial data. The data exchange engines 402, 422 may implement one or more of the methods disclosed herein to help control the exchange of user data in a manner that limits the loss of user privacy.

The network 420 may be a computer network implementing wired and/or wireless connections between two or more devices, including but not limited to the data exchange engines 402, 422. The network 420 may implement any communication protocol known in the art. Non-limiting examples of communication protocols include a local area network (LAN), a wireless LAN, an internet protocol (IP) network, and a cellular network.

In FIG. 4, two data exchange engines are shown by way of example. More than two data exchange engines may be in communication via the network 420 to exchange data.

The data exchange engine 402 includes a processor 404, memory 406, a network interface 408, an encrypter 416 and a decrypter 418. The memory 406 stores user data 410 including user identifiers 412 and activity data 414. Similarly, the data exchange engine 422 includes a processor 424, memory 426, a network interface 428, an encrypter 436 and a decrypter 438. The memory 426 stores user data 430 including user identifiers 432 and activity data 434. The data exchange engine 402 will be described by way of example below. However, it should be noted that the data exchange engine 422 may be implemented in a similar manner.

The processor 404 may be implemented by one or more processors that execute instructions stored in the memory 406. These instructions could perform any method described herein. Alternatively, some or all of the processor 404 may be implemented using dedicated circuitry, such as an application specific integrated circuit (ASIC), a graphics processing unit (GPU) or a programmed field programmable gate array (FPGA).

The network interface 408 is provided for communication over the network 420. The structure of the network interface 408 is implementation specific. For example, the network interface 408 may include a network interface card (NIC), a computer port (e.g., a physical outlet to which a plug or cable connects), and/or a network socket.

The user data 410 includes information pertaining to one or more users. Any, one, some or all of these users might be users of a computing platform that is associated with the data exchange engine 402. For example, if the data exchange engine 402 is associated with an e-commerce platform, then the user data 410 may include information pertaining to any, one, some or all of the customers and/or merchants of the e-commerce platform. These may be customers/merchants that have accounts on the e-commerce platform, use the e-commerce platform and/or are otherwise known to the e-commerce platform. However, it should be noted that the user data 410 is not limited to users of an associated computing platform, and may also or instead include information pertaining to users of other computing platforms that are separate from the data exchange engine 402, for example.

The user data 410 may be obtained in any of a number of different ways. In some implementations, at least some of the user data 410 is obtained from an associated computing platform. For example, information pertaining to users of the computing platform may be recorded in the user data 410. Alternatively or additionally, at least some of the user data 410 may be obtained from an external source, such as a repository of user data made available by particular users (for example, via an application installed on a user device) and/or by one or more other computing platforms that are separate from the data exchange engine 402.

While the user data 410 is illustrated as being stored in the data exchange engine 402, this is only an example. At least a portion of the user data 410 may be stored externally and accessed by the data exchange engine 402. In some implementations, the user data 410 is a buffer that temporarily stores user data during a data exchange process.

The user identifiers 412 in the user data 410 includes a list or record of information that enables different users to be identified. The user identifiers 412 may include multiple identifiers for a single user, which may be stored as different data fields for the user. Non-limiting examples of different data fields that may be included in the user identifiers 412 include names, email addresses, home/work/billing addresses, phone numbers, social insurance/security numbers, credit card numbers, drivers license numbers, health card numbers, bank account numbers and media access control addresses (MAC addresses). In some implementations, the user identifiers 412 may include personally identifiable information (PII).

The activity data 414 includes a record or log of activities associated with one or more users. These activities may include online activities and/or real-world activities performed by the users. The date and time at which the activities occurred and/or the duration of the activities may also be recorded in the activity data.

Online activities may be performed via a user device that is owned and/or operated by a user. Examples of online activities include (but are not limited to) email messaging, online shopping, online banking, social networking, online gaming, video/audio streaming, web conferencing and file sharing. In some implementations, the specific online resources accessed by a user device and/or the content included in those online resources may be logged or recorded in the activity data 414. Non-limiting examples of such online resources include webpages, screen pages, text, images, videos and audio.

Tables, arrays, data trees and/or other data structures could be implemented in the activity data 414 to organize records of user activities. In some implementations, the information recorded in the activity data 414 may be organized by user. Alternatively or additionally, the information recorded in the activity data 414 may be organized by type of activity.

The types of activities recorded in the activity data 414 may depend on the party and/or the computing platform that is associated with the data exchange engine 402. In one example, the data exchange engine 402 is associated with an online store. For each customer of the online store, the activity data 414 may include a record of the product pages viewed by the customer, the products added to the customer's shopping cart, and/or the product orders placed by the customer. The activity data 414 may further identify real-world activities performed by the customer, such as records of the customer purchasing products from a brick-and-mortar store owned by the same merchant as the online store, for example.

In another example, the data exchange engine 402 is associated with a banking platform. For each user of the banking platform, the activity data 414 includes a record of the financial transactions involving the user.

In a further example, the data exchange engine 402 is associated with a healthcare platform. For each user of the healthcare platform, the activity data 414 includes a record of the user's medical conditions and/or the medical treatments that the user has undergone.

In yet another example, the data exchange engine 402 is associated with a search engine. For each user of the search engine, the activity data 414 includes a record of user-provided search criteria and the search results that were selected by the user.

Table 1 below provides an example of user activity records for a social media platform. These records may be stored as activity data by the social media platform. In this way, Table 1 provides an example of the activity data 414 when the data exchange engine 402 is associated with a social media platform. As shown in Table 1, the records of webpages viewed by the user and advertisements displayed to the user are stored in terms of identifiers for those webpages and advertisements.

TABLE 1

Example activity data for a user of a social media platform

| | | | |
|---|---|---|---|
| Date of login to the social media platform | Aug. 23, 2020 | Aug. 24, 2020 | Aug. 26, 2020 |
| Duration of session following login | 23 minutes | 5 minutes | 9 minutes |
| Webpages viewed during session | Homepage_234723; Cats_124811; Dogs_98432; | Homepage_554 | Friend_900 |
| Advertisements displayed during session | OnlineStore1Ad_234; OnlineStore2Ad_2; OnlineStore1Ad_121; OnlineStore5Ad_87; OnlineStore5Ad_88; | OnlineStore1Ad_652; OnlineStore1Ad_39; | OnlineStore4Ad_14. |

It should be noted that while the user data 430 of the data exchange engine 422 might include types and/or formats of information that are similar to the user data 410, the user data 430 may correspond to users of a different computing platform. In this way, the user data 410 may be partially or entirely distinct from the user data 430.

The encrypter 416 is provided to encrypt data, optionally for transmission over the network 420. Encrypted data that is output by the encrypter 416 may be referred to as ciphertext. The decrypter 418 is provided to decrypt data, which may be data that was received over the network 420, for example. Decrypted data that is output by the decrypter 418 may be plaintext data that is readable by a party.

The encrypter 416 and the decrypter 418 may store, employ and/or implement one or more encryption and decryption algorithms. In some cases, the encryption and decryption algorithms are stored in the memory 406 and/or are executed by the processor 404. In this way, the encrypter 416 and/or the decrypter 418 may be implemented in whole or in part by the memory 406 and the processor 404. Alternatively or additionally, either or both of the encrypter 416 and the decrypter 418 may include dedicated memory and/or processors to store and/or execute the algorithms.

The algorithms implemented by the encrypter 416 and the decrypter 418 may be complementary, such that the decrypter 418 is able to decrypt data that was encrypted by the encrypter 416. In some implementations, an encryption/decryption algorithm is an asymmetric algorithm that encrypts data using a first key and decrypts data using a second key, which may be referred to as a "public key" and a "private key", respectively. Alternatively, an encryption/decryption algorithm may be symmetric, in which encryption and decryption are performed with the same key.

In some implementations, the encrypter 416 and/or the decrypter 418 implement commutative encryption. Commutative encryption allows a data set to be encrypted multiple times and then decrypted in any order. For example, when commutative encryption is implemented to encrypt a data set with a first key and then encrypt the data again with a second key, the encryption with the first and second key can be removed through decryption in any order. The Rivest-Shamir-Adleman (RSA) algorithm is one example of an encryption algorithm using which commutative encryption can be implemented. The RSA algorithm is described, for example, in Chapter 8, Section 8.2 of the Handbook of Applied Cryptography, by A. Menezes, P. van Oorschot, and S. Vanstone, CRC Press, Inc. 1997, the contents of which are herein incorporated by reference in their entirety. Another example is the Shamir, Rivest and Adleman (SRA) commutative encryption algorithm. The SRA algorithm is described, for example, in A. Shamir, R. L. Rivest, L. M. Adleman, Mental Poker, in: The Mathematical Gardner, Springer, 1981: pp. 37-43, the contents of which are herein incorporated by reference in their entirety.

In some implementations, the encrypter 416 and/or the decrypter 418 implement homomorphic encryption. Homomorphic encryption allows for the preservation of mathematical operations performed on encrypted data. For example, when addition, subtraction, multiplication and/or division operations are performed on homomorphically encrypted data, the results of these operations are maintained following decryption as if the operations had been performed on the decrypted or plaintext data.

Another potential property of homomorphic encryption is non-repeatability. This means that encrypting the same data with the same key might produce distinct encrypted results or ciphertext. In other words, $encrypt(x) \neq encrypt(x)$, even when the same key is used in each encryption.

Homomorphic encryption is described, for example, in F. Armknecht, C. Boyd, K. Gjøsteen, A. Jäschke, C. Reuter, M. Strand (2015). "A Guide to Fully Homomorphic Encryption." IACR Cryptol. ePrint Arch. 2015, 1192, the contents of which are herein incorporated by reference in their entirety. Further details and examples of homomorphic encryption may also be found in the following references, the contents of which are herein incorporated by reference in their entirety:

Craig Gentry (2009). "Fully homomorphic encryption using ideal lattices". Proceedings of the forty-first annual ACM Symposium on Theory of Computing (STOC '09). Association for Computing Machinery, New York, N.Y., USA, 169-178. DOI:https://doi.org/10.1145/1536414.1536440.

Craig Gentry and Shai Halevi (2010). "Implementing Gentry's fully-homomorphic encryption scheme". Cryptology ePrint Archive, Report 2010/520.

Marten van Dijk, Craig Gentry, Shai Halevi and Vinod Vaikuntanathan (2009). "Fully Homomorphic Encryption over the Integers". Cryptology ePrint Archive, Report 2009/616.

Jean-Sébastien Coron, David Naccache and Mehdi Tibouchi (2011). "Public Key Compression and Modulus Switching for Fully Homomorphic Encryption over the Integers". Cryptology ePrint Archive, Report 2011/440.

Jean-Sébastien Coron, Avradip Mandal, David Naccache and Mehdi Tibouchi (2011). "Fully Homomorphic Encryption over the Integers with Shorter Public Keys". Rogaway P. (eds) Advances in Cryptology—CRYPTO 2011. CRYPTO 2011. Lecture Notes in Computer Science, vol 6841. Springer, Berlin, Heidelberg. https://doi.org/10.1007/978-3-642-22792-9_28.

Jean-Sébastien Coron, Tancrède Lepoint and Mehdi Tibouchi (2013). "Batch Fully Homomorphic Encryption over the Integers". Cryptology ePrint Archive, Report 2013/03.

Jean-Sébastien Coron, Tancrède Lepoint and Mehdi Tibouchi (2014). "Scale-Invariant Fully Homomorphic Encryption over the Integers". Cryptology ePrint Archive, Report 2014/032.

Zvika Brakerski, Craig Gentry and Vinod Vaikuntanathan (2011). "Fully Homomorphic Encryption without Bootstrapping". Cryptology ePrint Archive, Report 2011/277.

Zvika Brakerski and Vinod Vaikuntanathan (2011). "Efficient Fully Homomorphic Encryption from (Standard) LWE". Cryptology ePrint Archive, Report 2011/344.

Adriana Lopez-Alt, Eran Tromer and Vinod Vaikuntanathan (2012). "On-the-Fly Multiparty Computation on the Cloud via Multikey Fully Homomorphic Encryption". Cryptology ePrint Archive, Report 2013/094.

Junfeng Fan and Frederik Vercauteren (2012). "Somewhat Practical Fully Homomorphic Encryption". Cryptology ePrint Archive, Report 2012/144.

Zvika Brakerski (2012). "Fully Homomorphic Encryption without Modulus Switching from Classical GapSVP". Cryptology ePrint Archive, Report 2012/07.

Joppe W. Bos, Kristin Lauter, Jake Loftus and Michael Naehrig (2013). "Improved Security for a Ring-Based Fully Homomorphic Encryption Scheme". Cryptology ePrint Archive, Report 2013/07.

Jung Hee Cheon, Andrey Kim, Miran Kim and Yongsoo Song (2017). "Homomorphic encryption for arithmetic of approximate numbers". Takagi T., Peyrin T. (eds) Advances in Cryptology—ASIACRYPT 2017. ASIACRYPT 2017. Springer, Cham. pp. 409-437.

Craig Gentry, Shai Halevi and Nigel P. Smart (2011). "Fully Homomorphic Encryption with Polylog Overhead". Cryptology ePrint Archive, Report 2011/566.

Craig Gentry, Shai Halevi and Nigel P. Smart (2011). Better Bootstrapping in Fully Homomorphic Encryption. Cryptology ePrint Archive, Report 2011/680.

Craig Gentry, Shai Halevi and Nigel P. Smart (2012). "Homomorphic Evaluation of the AES Circuit". Cryptology ePrint Archive, Report 2012/099.

Craig Gentry, Amit Sahai and Brent Waters (2013). "Homomorphic Encryption from Learning with Errors: Conceptually-Simpler, Asymptotically-Faster, Attribute-Based". Cryptology ePrint Archive, Report 2013/340.

Zvika Brakerski and Vinod Vaikuntanathan (2013). "Lattice-Based FHE as Secure as PKE". Cryptology ePrint Archive, Report 2013/541.

Example Processes for Data Exchange

Figure 5:
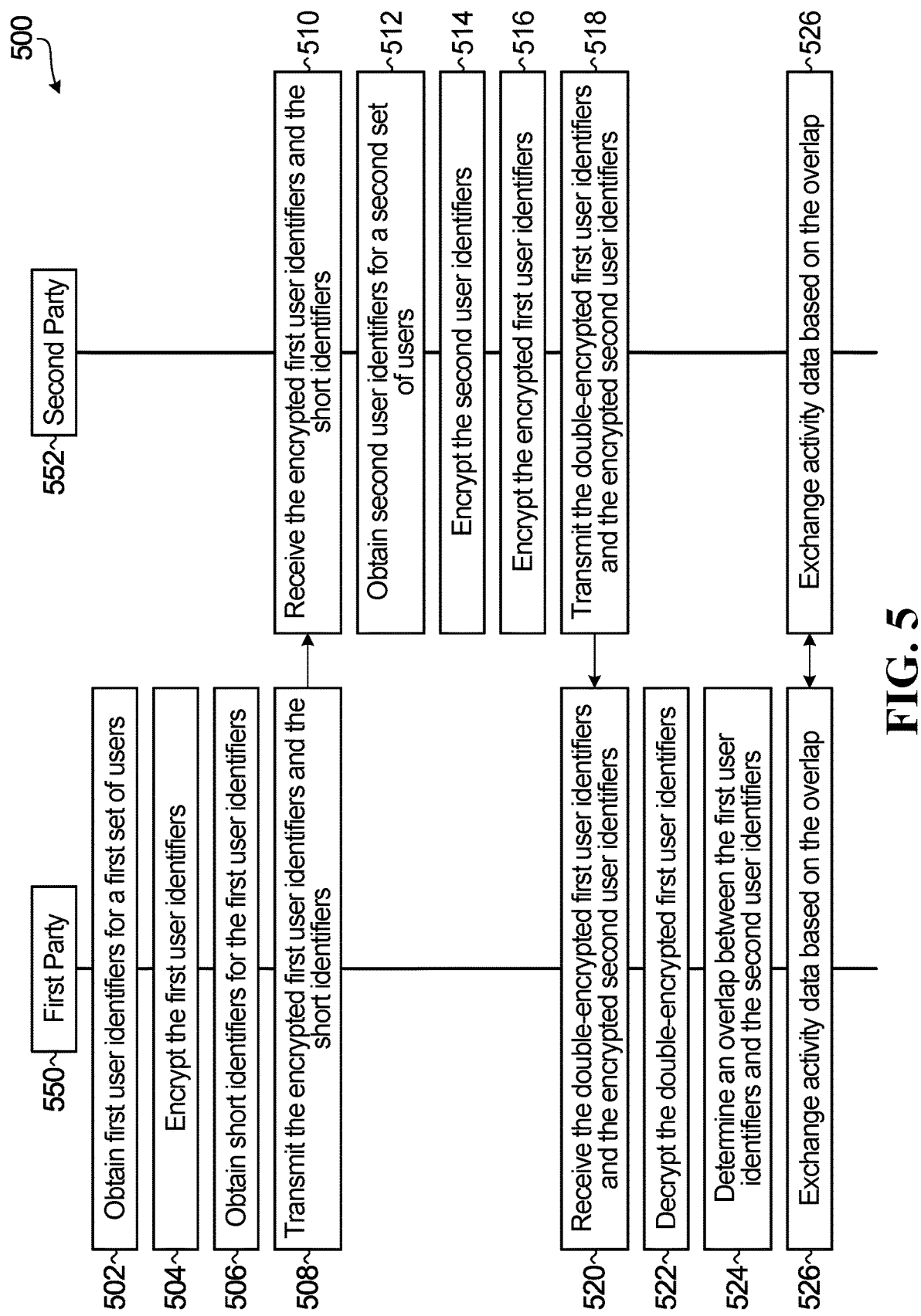
FIG. 5 is a flow diagram illustrating a process for exchanging user data between a first party and a second party, according to an embodiment.

FIG. 5 is a flow diagram illustrating a process 500 for exchanging user data between a first party 550 and a second party 552, according to an embodiment. Commutative encryption is implemented in the process 500 to help limit the exchange of user data to only users that are known to both the first party 550 and the second party 552. In some implementations, the process 500 is performed at least in part by the system 400 of FIG. 4. For example, when performing the process 500, the first party 550 may use the data exchange engine 402 and the second party 552 may use the data exchange engine 422.

In step 502, the first party 550 obtains first user identifiers that identify a first set of one or more users. These first user identifiers are an example of first user data or first verification data. In some implementations, the first user identifiers are obtained from and/or stored in the user identifiers 412 of the data exchange engine 402.

The first user identifiers may include at least one identifier for each user in the first set of users. By way of example, if the first set of users includes three different users, then the first user identifiers may include one or more identifiers for each of the three users. Each identifier in the first user identifiers may be assigned a respective label or index that allows the first party 550 and/or the second party 552 to recognise, track and/or reference the identifier throughout the process 500. These indices may be useful after encryption of the identifiers, when the identifiers might not be readable as plaintext.

The first user identifiers may be based on data fields that provide unique keys for the first set of users. The specific data fields that are used to generate the first user identifiers may be preselected and agreed upon by the first party 550 and the second party 552. For example, if both parties track their user's names, shipping addresses, email addresses and/or phone numbers, then any, one, some or all of these data fields could be used in the first user identifiers. The preselection of data fields may have been facilitated by one or more configuration messages (not shown) between the first party 550 and the second party 552.

The first set of users may include any, one, some or all of the users that are known to the first party 550. The first party 550 may select the first set of users based on the users that the first party 550 wishes to exchange user data pertaining to. However, the first party 550 may want to limit the exchange of data to users that the second party 552 already knows about. Consider, by way of example, a case in which the first party 550 is a merchant of an online store and the second party 552 is the operator of a social media platform that hosts advertisements for the online store. The online store may receive product orders from a set of one or more new customers. After receiving the product orders, the merchant may want to exchange user data with the social media platform in order to determine if any advertisements were presented to the new customers on the social media platform that may have resulted in them placing the orders in the online store. As such, the first user identifiers obtained in step 502 may include an identifier for each of the new customers.

In addition to identifiers for the first set of users, the first user identifiers obtained in step 502 may also include padding data. Padding data may include fake identifiers of non-existent users and/or random characters, for example. An advantage of including padding data in the first user identifiers is that it may help improve privacy for the first set of users. For example, if an adverse party successfully breaks any encryption on the first user identifiers that include both real and fake identifiers, then the adverse party might still not know which of the identifiers are real and which are fake.

Step 504 includes encrypting the first user identifiers with a commutative encryption algorithm. This may convert the first user identifiers into cyphertext. Step 504 may be performed using the encrypter 416 in the data exchange engine 402, for example.

In some implementations, the commutative encryption algorithm is a symmetric algorithm, in which case the first user identifiers are encrypted using a first key in step 504 and may also be decrypted using the first key. The first key might not be shared with the second party 552 or any other party. Alternatively, the commutative encryption algorithm may be an asymmetric algorithm, in which case the first user identifiers are encrypted using a first key in step 504 and may be decrypted using a second key. Although the first and second keys may be referred to as public and private keys, the first party 550 might not share either of the first and second keys with any other party.

In step 506, short identifiers for any, one, some or all of the first user identifiers are obtained. The short identifiers may provide an indication of the full identifiers (both real and fake) that are included in the first user identifiers, without providing enough information to disclose the full identifiers. As outlined below, short identifiers may be used to help reduce the amount of data that is encrypted, decrypted and/or transmitted over a network in the process 500. However, short identifiers might not be obtained in some implementations of the process 500, and therefore step 506 is considered optional.

A short identifier may be a prefix (for example, first x characters), a suffix (for example, last x characters) or a combination of characters (for example, first x characters and last x characters) of a full identifier. By way of example, if the first user identifiers include the identifier "john.smith@email.com", then the corresponding short identifier could be "jo" or "jo@email.com". In some implementations, the way in which short identifiers are defined in step 506 is predefined and agreed upon by the first party 550 and the second party 552 via one or more configuration messages (not shown).

Step 508 includes the first party 550 transmitting the encrypted first user identifiers generated in step 504 and, optionally, the short identifiers obtained in step 506, to the second party 552. Step 510 includes the second party 552 receiving the encrypted first user identifiers and, optionally, the short identifiers. The second party 552 cannot read and/or decipher the encrypted first user identifiers because the second party does not have the necessary key to remove the encryption applied in step 504. However, the short identifiers may be readable and/or decipherable by the second party 552. While the short identifiers may be encrypted by the first party 550 to hinder eavesdropping and/or tampering during transmission (for example, using hypertext transfer protocol secure (HTTPS)), the second party 552 may have the necessary key to decrypt the short identifiers.

Figure 6:
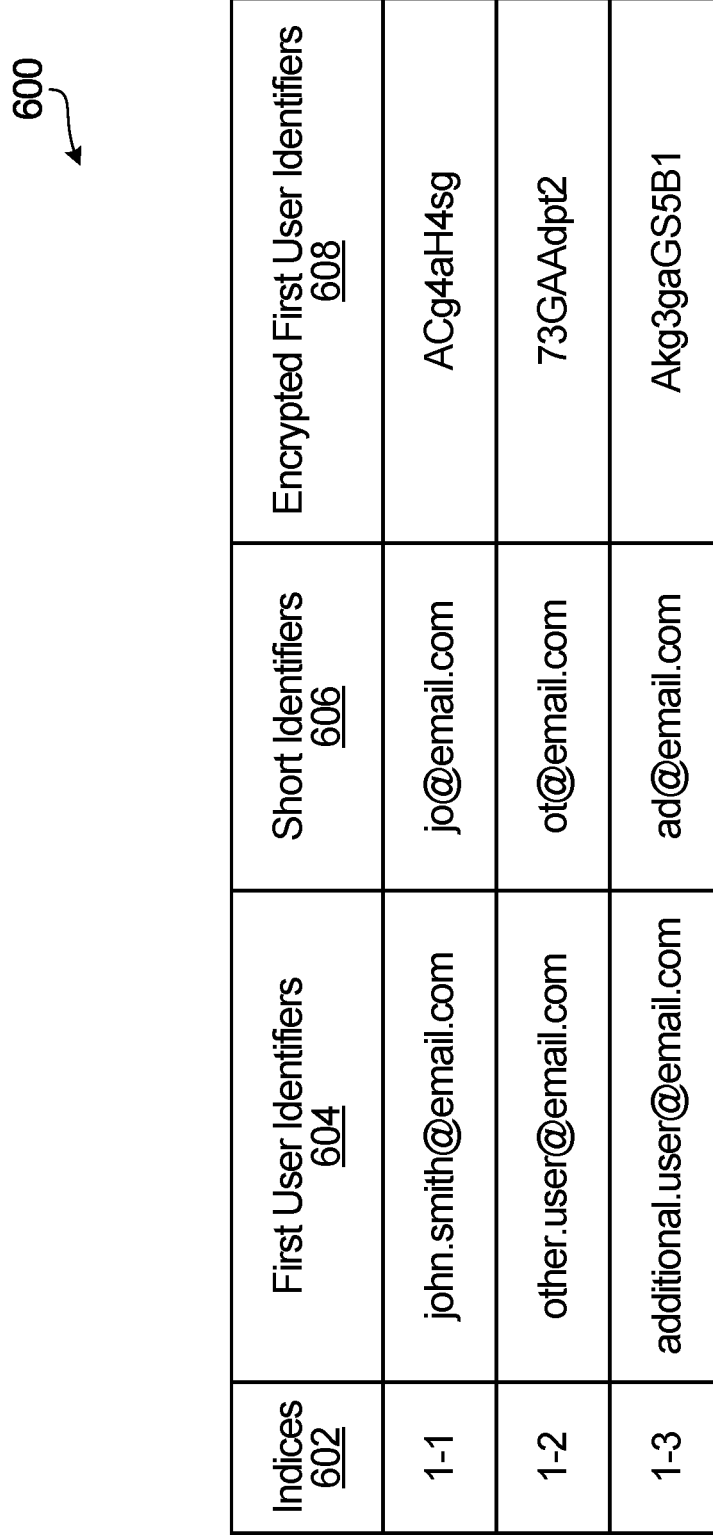
FIG. 6 illustrates a table including first user identifiers, short identifiers and encrypted first user identifiers corresponding to a first set of users, according to an embodiment.

FIG. 6 illustrates a table 600 including first user identifiers 604, short identifiers 606 and encrypted first user identifiers 608 corresponding to a first set of users, according to an embodiment. The table 600 further includes multiple indices 602 that include a respective index for each of the first user identifiers 604. In the illustrated example, the first user identifiers 604 include three identifiers that correspond to the indices 1-1, 1-2 and 1-3 in the indices 602.

The table 600 provides an example of data that may be generated and/or obtained by the first party 550 in steps 502, 504, 506 of the process 500. For example, the indices 602 and the first user identifiers 604 may be obtained in step 502, the short identifiers 606 may be obtained in step 506 and the encrypted first user identifiers 608 may be obtained in step 504. The encrypted first user identifiers 608, and optionally the indices 602 and/or the short identifiers 606, may be transmitted to the second party 552 in step 508.

Referring again to the process 500 of FIG. 5, step 512 includes the second party 552 obtaining second user identifiers for a second set of one or more users. The second user identifiers are examples of second user data or second verification data. The second user identifiers may include one or more identifiers for each user in the second set of users and may further include padding data. Each identifier in the second user identifiers may be assigned a respective label or index that allows the first party 550 and/or the second party 552 to recognise, track and reference the identifier throughout the process 500.

The data fields that are used to obtain the second user identifiers generally correspond to the data fields used to obtain the first user identifiers. This allows the second user identifiers to be compared to the first user identifiers to determine users that are common to the first party 550 and the second party 552. In some implementations, the second user identifiers are selected from the user identifiers 432 in the data exchange engine 422.

The second set of users is selected from the users known to the second party 552. If the second party 552 receives short identifiers from the first party 550 in step 510, then the second party 552 may use the short identifiers to help select the second set of users. Any of the second party's users that match at least one short identifier may be included in the second set of users, whereas users that do not match any of the short identifiers might be excluded from the second set of users. For example, if a short identifier for one of the first user identifiers is "jo", then the second party 552 might include any users matching that short identifier in the second set of users.

Short identifiers may reduce the number of users that are selected for the second set of users, which may ultimately reduce the number of identifiers in the second user identifiers. This could lead to improved efficiency and performance by reducing the amount of data that is encrypted, decrypted, compared and/or transmitted over a network in the process 500.

The length of a short identifier represents a trade off between security and efficiency. Increasing the length of a short identifier may allow the second party 552 to further reduce the number of users in the second set of users, but might also increase the probability that the first party 550 will inadvertently disclose some user data to the second party 552. For example, if a user's name is "Shi Ye", then a five-letter short identifier derived from that name could disclose the identity of the user to the second party 552.

Short identifiers are one example of a condition that may reduce the number of users in the second set of users. Other conditions that may be used to reduce the number of the users in the second set of users are also contemplated. In some implementations, conditions are based at least in part on non-personal user data. Such conditions may include, inter alia, certain activities performed by users and/or a timeframe for performing certain activities. In one example, the first party 550 may transmit a message to the second party 552 (optionally in step 508) that includes a condition limiting the second set of users to those that have been active on a computing platform associated with the second party 552 in the last 10 days. The second party might then use the activity data 434 in the data exchange engine 422 to determine which users were active over the last 10 days and define the second set of users accordingly.

In another example, the first party 550 may transmit a message to the second party 552 that includes a condition based on an identifier that is shared by both the first party 550 and the second party 552, but is unrelated to users' identities. An example of such an identifier is an advertising campaign identifier. Consider, once again, the case in which the first party 550 is associated with the online store and the second party 552 is associated with the social media platform. The online store may be interested in calculating conversion metrics for one of their advertising campaigns on the social media platform. The online store may therefore define a condition for the second set of users using a corresponding advertising campaign identifier that is known to the social media platform. Based on this condition, the social media platform may limit the second set of users to those that have been involved in that campaign (for example, users that have been shown advertisements for that campaign).

It should be noted that using multiple conditions to reduce the number of users in the second set of users may be implemented. For example, short identifiers and a timeframe for performing certain activities may be received by the second party in step 510 and used to help select the second set of users in step 512. However, in some implementations, the first party 550 might not provide any conditions to help reduce the size of the second set of users. The second set of users might therefore include all of the users known to the second party. For example, if the second party 552 has a relatively small number of users, then comparing the first user identifiers against each user that is known to the second party 552 might be acceptable.

In step 514, the second user identifiers are encrypted with a third key using the same commutative encryption algorithm that is used in step 504. The encryption applied in step 514 may be removed using the third key (in the case of symmetric encryption) or using a fourth key (in the case of asymmetric encryption). The third key and, if applicable, the fourth key used by the second party 552 are different from the first key and the second key used by the first party 550. The third key and, if applicable, the fourth key are also not known by the first party 550. As such, the first party 550 is not able to decipher the encrypted second user identifiers generated in step 514.

Step 516 includes encrypting the encrypted first user identifiers received in step 510 using the third key and the same commutative encryption algorithm that is used in steps 504, 514. Following step 516, the first user identifiers are encrypted using both the first key and the third key, and may be referred to as "double-encrypted first user identifiers" or "double-encrypted first user data".

In some implementations, one or both of steps 514, 516 are performed using the encrypter 436 in the data exchange engine 422.

In step 518, the encrypted second user identifiers generated in step 514 and the double-encrypted first user identifiers generated in step 516 are transmitted from the second party 552 to the first party 550. The first party 550 receives the encrypted second user identifiers and the double-encrypted first user identifiers in step 520. The combination of the encrypted second user identifiers and the double-encrypted first user identifiers is an example of intersection data that may enable the first party 550 to determine user identifiers that are included in both the first user identifiers and the second user identifiers.

In some implementations of step 518, the second party 552 also transmits a corresponding short identifier for one or more of the second user identifiers. These short identifiers may be received by the first party 550 in step 520 and may be readable or decipherable by the first party 550. As discussed in further detail below, the short identifiers for the second user identifiers may help the first party 550 more efficiently determine any user identifiers that are included in both the first user identifiers and the second user identifiers.

In step 522, the first party decrypts the double-encrypted first user identifiers using the first key (in the case of symmetric encryption) or the second key (in the case of asymmetric encryption) to remove the encryption applied using the first key in step 504. Step 522 leverages the commutative property of the encryption algorithm used in steps 504 and 516, which allows the encryption applied using the first key in step 504 to be removed without affecting the encryption applied using the third key in step 516. Step 522 therefore outputs the first user identifiers encrypted with only the third key, which is an example of "decrypted intersection data".

In some implementations, step 522 is performed using the decrypter 418 in the data exchange engine 402.

Following step 522, the first party 550 has versions of both the first user identifiers and the second user identifiers that are encrypted with the third key. A property of the commutative encryption algorithm used in steps 504, 514, 516 is that the encryption of identical data using the same key will produce the same encrypted result. In other words, the encryption is repeatable. As such, any identifiers that are in the first user identifiers and in the second user identifiers will appear as identical encrypted entries in the encrypted second user identifiers and the decrypted intersection data.

Step 524 includes determining an overlap between at least one of the first user identifiers and at least one of the second user identifiers. For example, using the decrypted intersection data and the encrypted second user identifiers, the first party 550 may compare the first user identifiers encrypted with the third key to the second user identifiers encrypted with the third key. Any identical encrypted identifiers that appear in the decrypted intersection data and in the encrypted second user identifiers may indicate an overlap. When an overlap is found, the first party 550 may determine the corresponding unencrypted identifier based on the index of the overlapping encrypted identifier in the decrypted intersection data. For example, if the overlapping encrypted identifier is the fifth identifier listed in the decrypted intersection data, then the fifth identifier in the first user identifiers is common to both the first party 550 and the second party 552.

In some implementations, the first party 550 may use short identifiers corresponding to the second user identifiers to help reduce the number of comparisons made between the decrypted intersection data and the encrypted second user identifiers. For example, the first party 550 may only compare an encrypted first user identifier to an encrypted second user identifier if the corresponding short identifiers match.

FIG. 7 illustrates a table 700 including the indices 602, the first user identifiers 604 and the short identifiers 606 for the first set of users of FIG. 6. The table 700 also includes decrypted intersection data 702, multiple indices 704 for a second set of users, short identifiers 706 for the second set of users and encrypted second user identifiers 708 for the second set of users. In the illustrated example, the second user identifiers include five identifiers labelled as 2-1, 2-2, 2-3, 2-4 and 2-5 by the indices 704.

Table 700 provides an example of data that may be compiled by the first party 550 to perform step 524 of the process 500. For example, the decrypted intersection data 702 may be generated in step 522, and the indices 704, the short identifiers 706 and the encrypted second user identifiers 708 may be received in step 520. In step 524, the first party 550 may compare the decrypted intersection data 702 to the encrypted second user identifiers 708 to determine which of the first user identifiers 604 are included in the second user identifiers. For each entry in the decrypted intersection data 702, the comparison to the encrypted second user identifiers 708 may be limited to users that have the same short identifier. By way of example, the user identifier corresponding to the index 1-1 has the same short identifier as the user identifiers corresponding to the indices 2-1 and 2-2. Accordingly, the entry in the decrypted intersection data 702 corresponding to the index 1-1 might only be compared to the entries in the encrypted second user identifiers 708 corresponding to the indices 2-1 and 2-2.

As shown in FIG. 7, the entry in the decrypted intersection data 702 corresponding to the index 1-1 matches or overlaps with the entry of the encrypted second user identifiers 708 corresponding to the index 2-2. This overlap is highlighted using vertical hashing in the table 700. Further, the entry in the decrypted intersection data 702 corresponding to the index 1-3 overlaps with the entry in the encrypted second user identifiers 708 corresponding to the index 2-4, which is highlighted using horizontal hashing in the table 700. Thus, the first party 550 may determine that the users corresponding to the indices 1-1 and 1-3 are known by the second party 552. In other words, users that have the email addresses "john.smith@email.com" and "additional.user@email.com" are common to the first party 550 and the second party 552. Because the entry in the decrypted intersection data 702 corresponding to the index 1-2 does not overlap with any entries in the encrypted second user identifiers 708, the first party 550 may determine that the user corresponding to the index 1-2 is not known to the second party 552.

Step 526 includes the first party 550 and the second party 552 exchanging activity data and/or other user data based on the overlap determined in step 524. This activity data may pertain to any, one, some or all of the users that were determined to be common to the first party 550 and the second party 552. In some implementations, step 526 may include the first party 550 obtaining information pertaining to the common users from the activity data 414 in the data exchange engine 402 and transmitting this information to the second party 552. The second party 552 may receive the information and store the information in the activity data 434 of the data exchange engine 422. Alternatively or additionally, step 526 may include the second party 552 obtaining information pertaining to the common users from the activity data 434 and transmitting the information to the first party 550, where the information may be received and stored in the activity data 414 of the data exchange engine 402.

In some implementations, step 526 includes the first party 550 transmitting readable or decriable identifiers of the common users to the second party 552 to inform the second party 552 of the common users. In response to receiving the identifiers of the common users, the second party 552 may then send activity data pertaining to the common users to the first party 550.

Consider, once again, the case in which the first party 550 is associated with the online store and the second party 552 is associated with the social media platform. In one implementation of step 526, the online store may send the social media platform the identifiers of one or more users that are common to both parties. In response, the social media platform may send the online store a record of any, some or all advertisements for the online store that were presented to the common users. This record may include, inter alia, the specific advertisement(s) presented, the date and time that the advertisement(s) was/were presented, and the duration of time that the advertisement(s) was/were presented for. This may potentially allow the online store to determine conversion metrics for advertising on the social media platform. In another implementation of step 526, the online store may transmit a record of e-commerce transactions pertaining to the common users to the social media platform. This record may include the purchases made by the common users and the date at which the purchases were made, for example. While the record of e-commerce transactions may be masked or encrypted during transmission for security reasons, the record is readable or decipherable by the social media platform. The social media platform could compare the e-commerce transactions to the advertisements presented to the common users and determine the conversion metrics for the advertising. These conversion metrics may then be transmitted to the online store.

The process 500 implements commutative encryption to help facilitate data exchange. Processes implementing other forms of encryption for data exchange are also contemplated.

FIG. 8 is a flow diagram illustrating a process 800 for exchanging user data between a first party 850 and a second party 852, according to another embodiment. Homomorphic encryption is implemented in the process 800 to help limit the exchange of user data to users that are known to both the first party 850 and the second party 852. In some implementations, the process 800 is performed at least in part by the system 400 of FIG. 4. For example, when performing the process 800, the first party 850 may use the data exchange engine 402 and the second party 852 may use the data exchange engine 422.

In step 802, the first party 850 obtains first user identifiers corresponding to a first set of one or more users known to the first party 850. The first party 850 may want to exchange information with the second party 852 pertaining to any users in the first set of users that the second party 852 already knows about. Further details regarding obtaining first user identifiers for a first set of users are provided above with reference to step 502 of the process 500.

Step 804 includes encrypting the first user identifiers using a homomorphic encryption algorithm. This algorithm allows mathematical operations that are performed on the encrypted first user identifiers to be maintained once the encryption is removed. In some implementations, step 804 is performed using the encrypter 416 in the data exchange engine 402.

In some implementations, the homomorphic encryption algorithm used in step 804 is an asymmetric algorithm that encrypts data using a first key and decrypts data using a second key. The first key may be shared with the second party 852 and the second key may be kept confidential. In this way, the first key may be considered a public key and the second key may be considered a private key.

Optionally, the homomorphic encryption applied in step 804 is non-repeatable. This may help maintain the privacy of the first user identifiers. For example, even if another party has the encrypted first user data and the first key, that party would not be able to determine the first user data by guessing user identifiers, encrypting those guesses with the first key and comparing the encrypted guesses to the encrypted first user data.

Step 806 is an optional step that includes obtaining short identifiers for one or more of the first user identifiers. Further details regarding obtaining short identifiers are provided above with reference to step 506 of the process 500.

FIG. 6 provides an example of first user identifiers, short identifiers and encrypted first user identifiers that could be obtained and/or generated by the first party 850 following steps 802, 804, 806.

The encrypted first user identifiers obtained in step 804 and, optionally, the short identifiers obtained in step 806 are transmitted by the first party 850 in step 808 and are received by the second party 852 in step 810. Further, if the second party 852 does not already know the first key that is used to perform the encryption in step 804, then the first key may also be transmitted by the first party 850 in step 808 and received by the second party 852 in step 810. The second party 852 does not know the second key needed to decrypt the encrypted first user identifiers, and therefore the second party 852 is generally unable to decipher or read the first user identifiers. However, the second party 852 may be able to decipher or read the short identifiers.

In step 812, the second party 852 obtains second user identifiers for a second set of users. As discussed in further detail elsewhere herein, the second set of users may be selected based on short identifiers and/or other conditions provided by the first party 850. Step 814 then includes encrypting the second user identifiers using the same first key and the same homomorphic encryption algorithm that is used in step 804. Thus, the same encryption may be applied to the second user identifiers in step 814 that was applied to the first user identifiers in step 804. In some implementations, step 814 is performed using the encrypter 436 in the data exchange engine 422.

In step 816, one or more numerical differences between the encrypted first user identifiers received in step 810 and the encrypted second user identifiers generated in step 814 are determined. The subtraction operation may be performed using binary arithmetic on the binary representations of the encrypted first user identifiers and the encrypted second user identifiers.

Step 816 may include an element-by-element subtraction of the encrypted first user identifiers from the encrypted second user identifiers, or vice versa. By way of example, if the first user identifiers includes three identifiers and the second user identifiers includes two identifiers, then a total of six different numerical differences could be calculated in step 816. Alternatively, short identifiers may be used to reduce the number of numerical differences calculated in step 816 by only performing the subtraction operation on encrypted identifiers having the same short identifier.

In some implementations, step 816 further includes multiplying each numerical difference by a random number or string that is not disclosed to the first party. The multiplication operation may be performed using binary arithmetic on the binary representations of the numerical differences. As discussed in further detail below, this may help improve privacy for the users in the second set of users.

In step 818, the numerical differences calculated in step 816, which are optionally multiplied by a random number, are transmitted from the second party 852 to the first party 850. The first party 850 receives the numerical differences in step 820. The numerical differences provide an example of intersection data that may be used by the first party 850 to determine user identifiers that are included in both the first user identifiers and the second user identifiers.

In some implementations of step 818, the second party 852 also transmits a corresponding short identifier for each of the numerical differences. These short identifiers are readable and/or decipherable by the first party 850 and may allow the first party 850 to determine which numerical difference corresponds to which of the first user identifiers. Alternatively or additionally, the numerical differences may be labelled to indicate which numerical difference corresponds to which of the first user identifiers. For example, each numerical difference may be labeled with an index corresponding to the first user identifier that was used to generate the numerical difference.

Step 822 includes the first party 850 decrypting the numerical differences using the second key, producing decrypted numerical differences. The decrypted numerical differences are an example of decrypted intersection data. In some implementations, step 822 is performed using the decrypter 418 in the data exchange engine 402.

In step 824, the first party 850 determines an overlap between at least one of the first user identifiers and at least one of the second user identifiers based on which of the decrypted numerical differences are equal to zero. Null differences represent user identifiers that are included in both the first user identifiers and the second user identifiers. Accordingly, the users corresponding to the null differences are common to both the first party 850 and the second party 852. The first party 850 may determine which user identifier corresponds to a null difference in the decrypted numerical differences based on an index of the null difference and/or a short identifier corresponding to the null difference, for example.

Steps 822, 824 leverage the preservation of mathematical operations provided by the homomorphic encryption algorithm used in steps 804, 814. For example, without the preservation of the subtraction and multiplication operations performed on the encrypted first user identifiers and the encrypted second user identifiers in step 816, there would be no necessity that the same identifier in the first user identifiers and the second user identifiers would equal zero in the decrypted numerical differences.

Multiplying the numerical differences by a random number in step 816 may help prevent the first party 850 from being able to determine any of the second user identifiers that are not already known to the first party 850. For example, if the numerical differences calculated in step 816 are not multiplied by the random number, then adding or subtracting the first user identifiers to/from the decrypted intersection data could allow the first party 850 to read the second user identifiers as plaintext. Stated as an equation, decrypt(a[encrypt(second user identifiers)-encrypt(first user identifiers)])+first user identifiers=a(second user identifiers), where is a is the random number. If a=1 (i.e., the numerical differences are not altered in step 816), then the first party 850 may be able to read all of the second user identifiers. In contrast, if a≠1, then the first party 850 might not be able to read the second user identifiers without knowledge of a.

Figure 9:
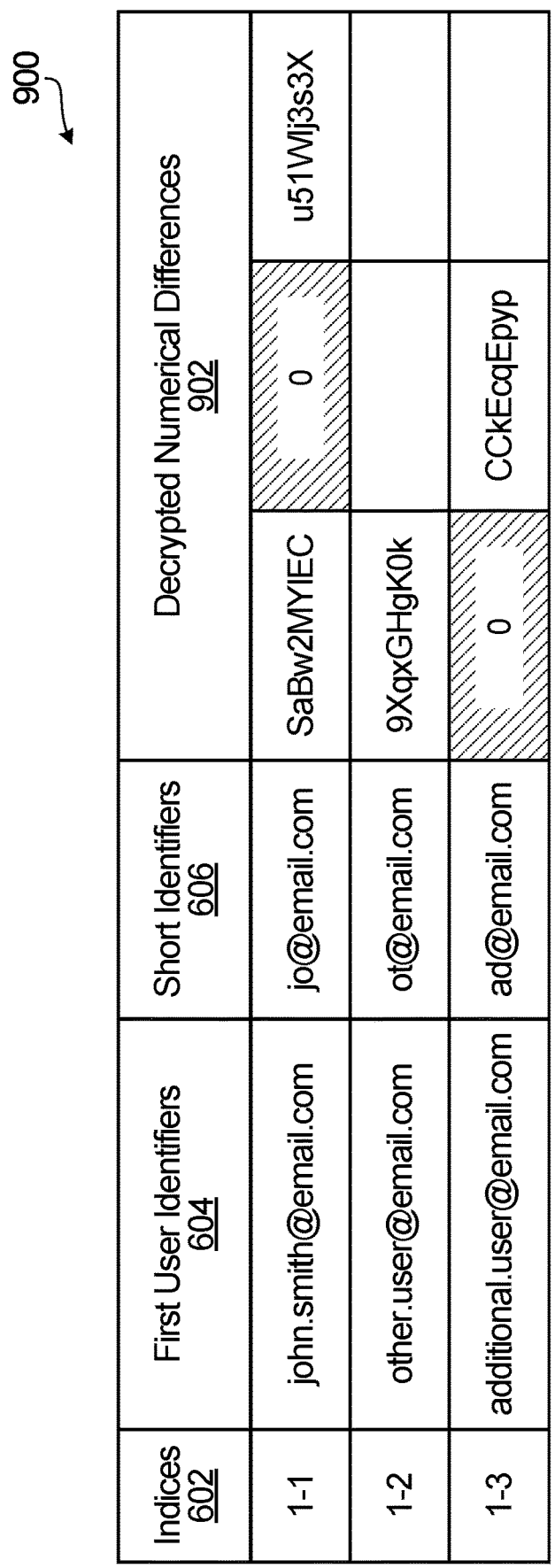
FIG. 9 illustrates a table including the first user identifiers and the short identifiers of FIG. 6, as well as decrypted numerical differences.

FIG. 9 illustrates a table 900 including the indices 602, the first user identifiers 604 and the short identifiers 606 for the first set of users of FIG. 6. The table 900 also includes decrypted numerical differences 902, which may have been generated in step 822 of the process 800, for example.

Each row of the decrypted numerical differences 902 corresponds to a different identifier in the first user identifiers 604. As illustrated, the decrypted numerical differences 902 includes three decrypted numerical differences corresponding to the index 1-1, one decrypted numerical difference corresponding to the index 1-2, and two decrypted numerical differences corresponding to the index 1-3. The number of decrypted numerical differences in each row may reflect the number identifiers in the second user identifiers that match each of the short identifiers 606. By way of example, in step 812, the second party 852 may have determined that three of their users match the short identifier corresponding to the index 1-1 (i.e., "jo@email.com"). A numerical difference between the encrypted identifiers for each of these three users and the encrypted identifier corresponding to the index 1-1 may then have been calculated by the second party 852 in step 816. In step 818, when the numerical differences are transmitted from the second party 852 to the first party 850, the second party 852 may have identified the numerical differences corresponding to the index 1-1 by labelling those numerical differences with the index 1-1 and/or by labelling those numerical differences with the short identifier "jo@email.com", for example.

The first party 850 may have generated the table 900 to perform step 824 of the process 800. Each value of zero in the decrypted numerical differences 902 (highlighted using diagonal hashing in FIG. 9) indicates an instance of overlap between the first user identifiers and the second user identifiers. As illustrated, the rows of the decrypted numerical differences 902 corresponding to the indices 1-1 and 1-3 each include a null value, and therefore the users in the first set of users correspond to the indices 1-1 and 1-3 and are known to the second party 852. The first party 850 may therefore determine that these users are common to both parties.

In step 826 of the process 800, the first party 850 and the second party 852 exchange activity data and/or other user data based on the overlap determined in step 824. Further details regarding the exchange of activity data are provided above with reference to step 526 of the process 500.

General Examples

Figure 10:
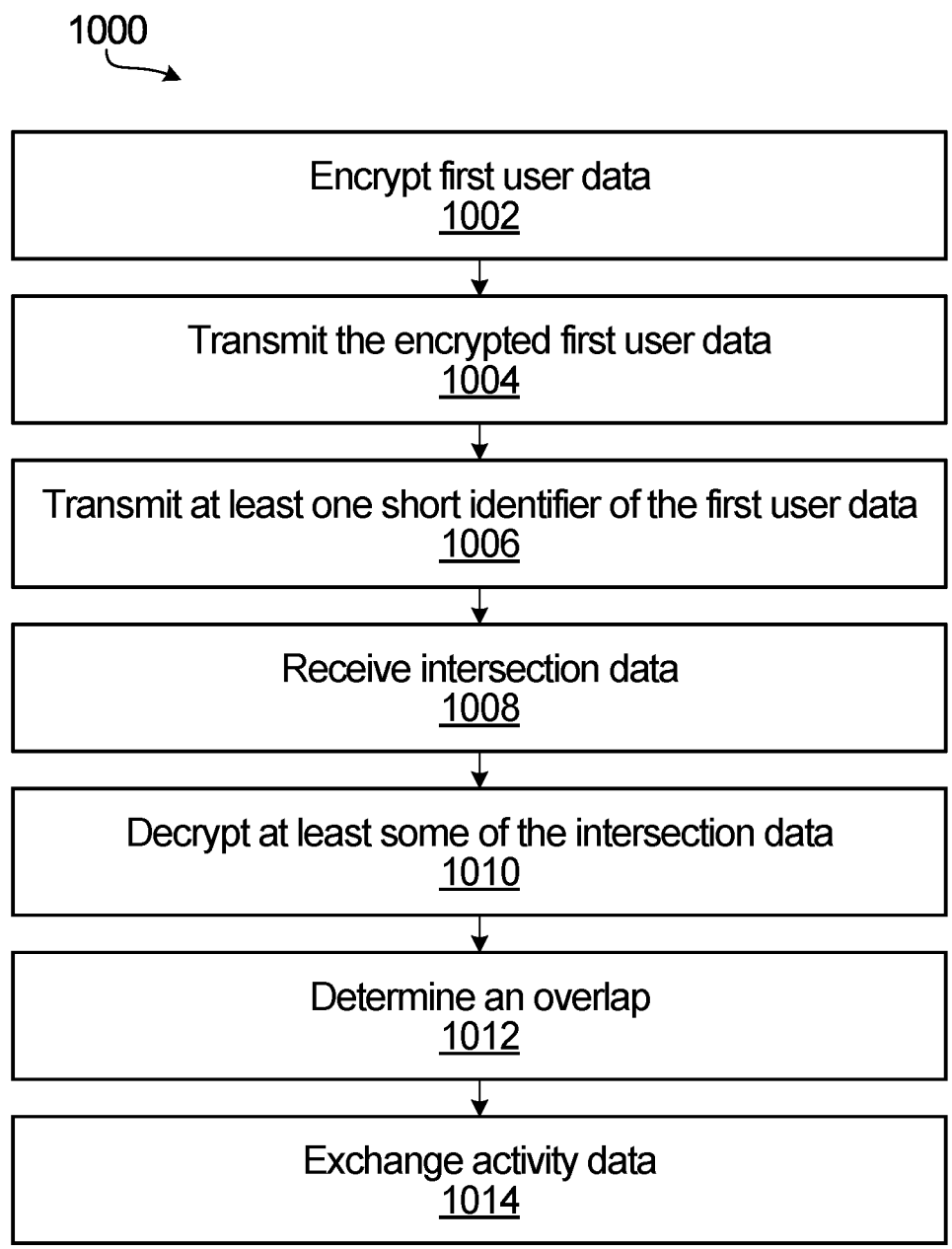
FIGS. 10 and 11 are flow diagrams illustrating methods for exchanging user data, according to some embodiments.

FIG. 10 is a flow diagram illustrating a method 1000 for exchanging user data, according to an embodiment. The method 1000 may be performed by the first party 550 during the process 500 of FIG. 5 and/or by the first party 850 during the process 800 of FIG. 8. In this way, the method 1000 may be considered a partial generalization of the processes 500, 800. However, it should be noted that the method 1000 is in no way limited to the processes 500, 800.

The method 1000 will be described as being performed by the data exchange engine 402 of FIG. 4 to help facilitate data exchange with the data exchange engine 422, but this is only an example. The method 1000 could more generally be performed by other systems and/or devices. Further, the method 1000 may be performed to help facilitate data exchange with systems and/or devices other than the data exchange engine 422.

Step 1002 includes the encrypter 416 encrypting first user data with a first key to obtain encrypted first user data. The first user data and the encrypted first user data may correspond to a first set of one or more users. For example, the first user data may include one or more identifiers of users in the first set of users. These identifiers may be obtained from the user identifiers 412 stored in the memory 406 and/or from another computer readable medium, for example. The first user data may also include padding data. Examples of first user data are described above with reference to step 502 of the process 500 and to step 802 of the process 800.

In some implementations, step 1002 includes commutatively encrypting the first user data with the first key to obtain the encrypted first user data, as in step 504 of the process 500, for example. Alternatively or additionally, step 1002 may include homomorphically encrypting the first user data with the first key to obtain the encrypted first user data, as in step 804 of the process 800, for example.

Step 1004 includes the processor 404 transmitting the encrypted first user data to the data exchange engine 422 and/or to another device. Step 1006 is an optional step that includes the processor 404 transmitting at least one short identifier of the first user data to the data exchange engine 422 and/or to another device. Step 508 of the process 500 and step 808 of the process 800 provide examples of steps 1004, 1006.

Step 1008 includes the processor 404 receiving intersection data from the data exchange engine 422 and/or from another device. The intersection data is based on the encrypted first user data and second user data corresponding to a second set of users. The second user data may include one or more identifiers of users in the second set of users and/or padding data. In some implementations, the second user data is associated with the at least one short identifier optionally transmitted in step 1006. For example, the second set of users may have been selected, at least in part, based on the at least one short identifier.

In some implementations, step 1008 may be similar to step 520 of the process 500. For example, the intersection data may include or may otherwise be based on double-encrypted first user data and encrypted second user data. The double-encrypted first user data may correspond to the encrypted first user data being further encrypted with a third key by the data exchange engine 422, for example. The encrypted second user data may also correspond to the second user data encrypted with the third key by the data exchange engine 422, for example. The third key may be different from the first key used in step 1002.

In some implementations, step 1008 may be similar to step 820 of the process 800. For example, the intersection data may be based on a difference between the encrypted first user data and encrypted second user data. The encrypted second user data may correspond to the second user data encrypted with the first key by the data exchange engine 422, for example. Optionally, the intersection data is further based on or includes the numerical difference multiplied by a random number.

Step 1010 includes the decrypter 418 decrypting at least some of the intersection data with a second key to obtain decrypted intersection data. The decryption using the second key may remove the encryption applied using the first key in step 1002. However, if a symmetric encryption algorithm is used in step 1002, then the first key and the second key may be identical.

In some implementations, step 1010 further includes decrypting double-encrypted first user data with the second key to obtain the decrypted intersection data, as in step 522 of the process 500, for example. Alternatively or additionally, step 1010 may include decrypting the numerical differences using the second key, as in step 822 of the process 800, for example.

Step 1012 includes the processor 404 determining, based on the decrypted intersection data, an overlap between at least some of the first user data and at least some of the second user data. This overlap could correspond to one or more users that are in both the first set of users and the second set of users. For example, step 1012 could include determining that an identifier of a user is in both the first user data and the second user data.

In some implementations, step 1012 may include determining an overlap between the decrypted intersection data and the encrypted second user data, similar to step 524 of the process 500, for example. Alternatively or additionally, step 1012 may include determining that at least one decrypted numerical difference equals zero, similar to step 824 of the process 800, for example.

Step 1014 includes the processor 404 exchanging activity data with the data exchange engine 422 and/or another device. The activity data may correspond to the users that are in both of the first and second sets of users. Step 1014 may include transmitting and/or receiving the activity data. Optionally, the activity data includes personal information corresponding to a user that is in both the first set of users and the second set of users. An example of activity data is a record of digital advertising presented to the user. In some implementations, the activity data is obtained from the activity data 414 stored in the memory 406 and/or from another computer readable medium. Step 526 of the process 500 and step 826 of the process 800 are two possible implementations of step 1014.

Figure 11:
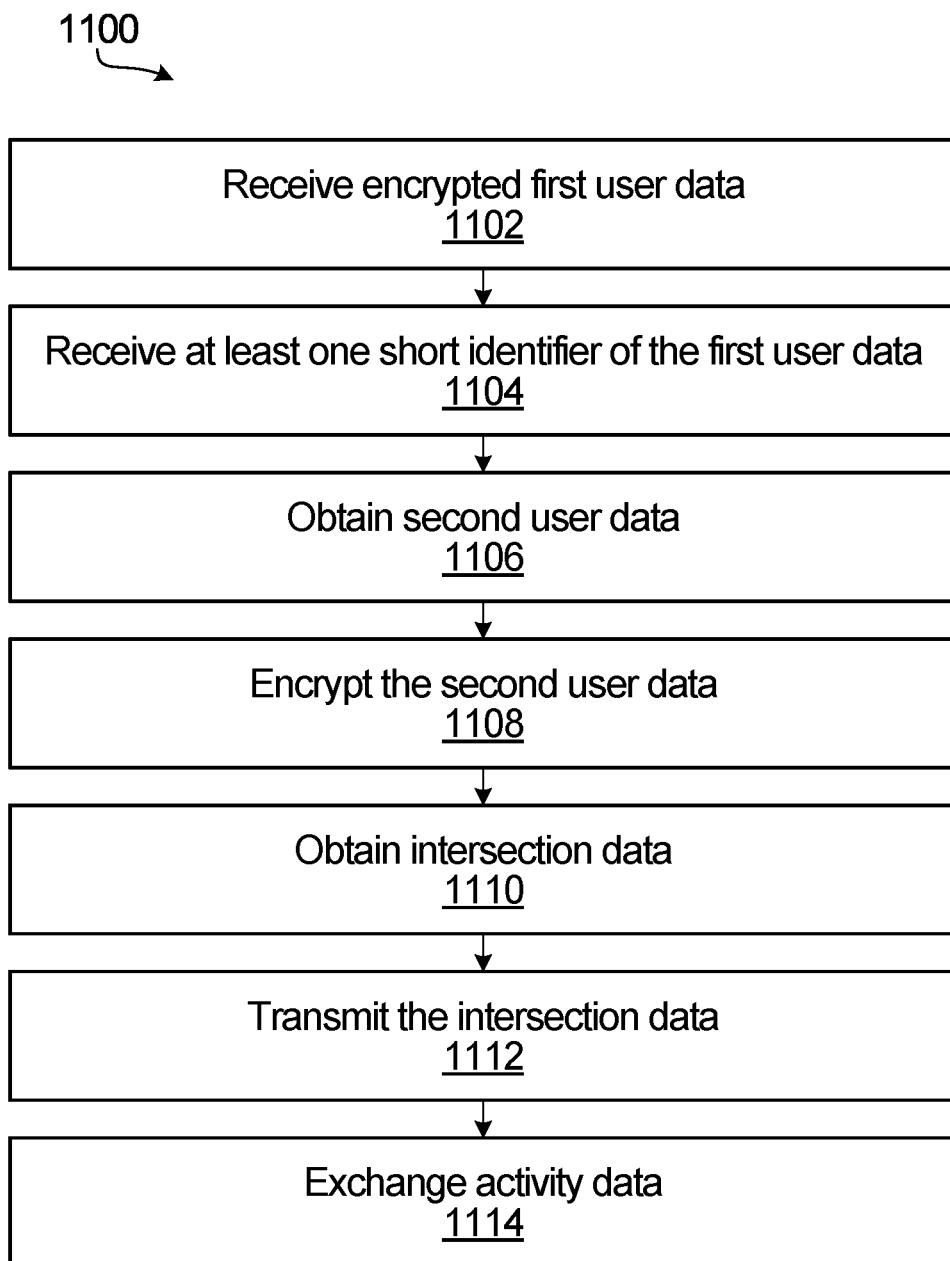

FIG. 11 is a flow diagram illustrating a method 1100 for exchanging user data, according to another embodiment.

The method 1100 may be performed by the second party 552 during the process 500 of FIG. 5 and/or by the second party 852 during the process 800 of FIG. 8. In this way, the method 1100 may be considered a partial generalization of the processes 500, 800. However, it should be noted that the method 1100 is in no way limited to the processes 500, 800. The method 1100 may also be considered complementary to the method 1000 of FIG. 10. For example, the methods 1000, 1100 may be performed simultaneously by respective parties that wish to exchange user data.

The method 1100 will be described as being performed by the data exchange engine 402 of FIG. 4 to help facilitate data exchange with the data exchange engine 422, but this is only an example. The method 1100 could more generally be performed by other systems and/or devices. Further, the method 1100 may be performed to help facilitate data exchange with systems and/or devices other than the data exchange engine 422.

Step 1102 includes the processor 424 receiving encrypted first user data from the data exchange engine 402 and/or from another device. The encrypted first user data may correspond to first user data that is encrypted with a first key, where first user data corresponds to a first set of one or more users. In some implementations, the first user data includes one or more identifiers for the first set of users.

Step 1104 is an optional step that includes the processor 424 receiving at least one short identifier of the first user data from the data exchange engine 402 and/or from another device. Step 510 of the process 500 and step 810 of the process 800 are two examples of steps 1102, 1104.

In step 1106, the processor 424 obtains second user data corresponding to a second set of one or more users. The second user data may include one or more identifiers for the second set of users. The second user data may further include padding data. In some implementations, the second user data is obtained from the user identifiers 432 stored in the memory 426 and/or from another computer readable medium. Step 512 of the process 500 and step 812 of the process 800 are two example implementations of step 1106.

Step 1108 includes the encrypter 436 encrypting the second user data to obtain encrypted second user data. Step 1108 may be performed using a commutative encryption algorithm, as in step 514 of the process 500, for example. Alternatively or additionally, step 1108 may be performed using a homomorphic encryption algorithm, as in step 814 of the process 800, for example.

Step 1110 includes the processor 424 and/or encrypter 436 obtaining intersection data. The intersection data may be based on the encrypted first user data received in step 1102 and/or on the encrypted second user data generated in step 1108. Step 1112 then includes transmitting intersection data to the data exchange engine 402 and/or to another device.

The format of the intersection data is implementation specific. Examples of intersection data are provided elsewhere herein. In some implementations, steps 1110, 1112 are similar to steps 516, 518 of the process 500. Alternatively or additionally, steps 1110, 1112 may be similar to steps 816, 818 of the process 800.

Step 1114 includes the processor 424 exchanging activity data with the data exchange engine 402 and/or with another device. This activity data may correspond to one or more users that are determined to be in both of the first and second sets of users. In some implementations, the activity data is obtained from the activity data 434 or from another computer readable medium. Step 526 of the process 500 and step 826 of the process 800 are two possible implementations of step 1114.

It should be noted that the order of steps 1002, 1004, 1006, 1008, 1010, 1012, 1014 in FIG. 10 and steps 1102, 1104, 1106, 1108, 1110, 1112, 1114 in FIG. 11 are shown by way of example. Other orders are also contemplated. For example, step 1006 may be performed before step 1004 and/or the steps 1004, 1006 may be performed simultaneously.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The invention claimed is:

1. A computer-implemented method comprising:
   encrypting first user data with a first key to obtain encrypted first user data corresponding to a first set of users;
   transmitting the encrypted first user data to a device;
   receiving intersection data from the device, the intersection data based on the encrypted first user data and second user data corresponding to a second set of users;
   decrypting at least some of the intersection data with a second key to obtain decrypted intersection data;
   determining, based on the decrypted intersection data, an overlap between at least some of the first user data and at least some of the second user data, the overlap corresponding to users that are in both of the first set of users and the second set of users; and
   exchanging activity data with the device corresponding to the users that are in both of the first set of users and the second set of users.

2. The computer-implemented method of claim 1, wherein:
   determining the overlap between the at least some of the first user data and the at least some of the second user data comprises determining that an identifier of a user is in the first user data and in the second user data; and
   the activity data comprises personal information corresponding to the user.

3. The computer-implemented method of claim 2, wherein the activity data includes a record of digital advertising presented to the user.

4. The computer-implemented method of claim 1, wherein encrypting the first user data with the first key to obtain the encrypted first user data comprises homomorphically encrypting the first user data with the first key to obtain the encrypted first user data.

5. The computer-implemented method of claim 4, wherein the intersection data is based on a difference between the encrypted first user data and encrypted second user data, the encrypted second user data corresponding to the second user data encrypted with the first key.

6. The computer-implemented method of claim 5, wherein determining the overlap between the at least some of the first user data and the at least some of the second user data comprises determining that the difference equals zero.

7. The computer-implemented method of claim 1, wherein at least one of the first user data and the second user data comprises an identifier of a user and padding data.

8. The computer-implemented method of claim 1, further comprising:
   transmitting at least one short identifier of the first user data to the device, wherein the second user data is associated with the at least one short identifier.

9. The computer-implemented method of claim 1, wherein encrypting the first user data with the first key to obtain the encrypted first user data comprises commutatively encrypting the first user data with the first key to obtain the encrypted first user data.

10. The computer-implemented method of claim 9, wherein the intersection data is based on double-encrypted first user data and encrypted second user data, the double-encrypted first user data corresponding to the encrypted first user data further encrypted with a third key, and the encrypted second user data corresponding to the second user data encrypted with the third key.

11. The computer-implemented method of claim 10, wherein:
   decrypting the at least some of the intersection data with the second key to obtain the decrypted intersection data comprises decrypting the double-encrypted first user data with the second key to obtain the decrypted intersection data; and
   determining the overlap between the at least some of the first user data and the at least some of the second user data comprises determining an overlap between the decrypted intersection data and the encrypted second user data.

12. A computer-implemented method comprising:
   receiving encrypted first user data from a device, the encrypted first user data corresponding to first user data encrypted with a key and the first user data corresponding to a first set of users;
   obtaining second user data corresponding to a second set of users;
   encrypting the second user data to obtain encrypted second user data;
   transmitting intersection data to the device, the intersection data based on the encrypted first user data and the encrypted second user data; and
   exchanging activity data with the device corresponding to the users that are in both of the first set of users and the second set of users.

13. A system comprising:
   memory to store first user data corresponding to a first set of users; and
   at least one processor to:
      encrypt the first user data with a first key to obtain encrypted first user data;
      transmit the encrypted first user data to a device;
      receive intersection data from the device, the intersection data based on the encrypted first user data and second user data corresponding to a second set of users;
      decrypt at least some of the intersection data with a second key to obtain decrypted intersection data;
      determine, based on the decrypted intersection data, an overlap between at least some of the first user data and at least some of the second user data, the overlap corresponding to users that are in both of the first set of users and the second set of users; and
      exchange activity data with the device corresponding to the users that are in both of the first set of users and the second set of users.

14. The system of claim 13, wherein:
   the overlap comprises an identifier of a user that is in the first user data and in the second user data; and
   the activity data comprises personal information corresponding to the user.

15. The system of claim 14, wherein the activity data includes a record of digital advertising presented to the user.

16. The system of claim 13, wherein the at least one processor is to homomorphically encrypt the first user data with the first key to obtain the encrypted first user data.

17. The system of claim 16, wherein the intersection data is based on a difference between the encrypted first user data and encrypted second user data, the encrypted second user data corresponding to the second user data encrypted with the first key.

18. The system of claim 17, wherein the at least one processor is to determine the overlap based on the difference being equal to zero.

19. The system of claim 13, wherein at least one of the first user data and the second user data comprises an identifier of a user and padding data.

20. The system of claim 13, wherein the at least one processor is further to transmit at least one short identifier of the first user data to the device, wherein the second user data is associated with the at least one short identifier.

21. The system of claim 13, wherein the at least one processor is to commutatively encrypt the first user data with the first key to obtain the encrypted first user data.

22. The system of claim 21, wherein the intersection data is based on double-encrypted first user data and encrypted second user data, the double-encrypted first user data corresponding to the encrypted first user data further encrypted with a third key, and the encrypted second user data corresponding to the second user data encrypted with the third key.

23. The system of claim 22, wherein the at least one processor is to:
  decrypt the double-encrypted first user data with the second key to obtain the decrypted intersection data; and
  determine the overlap between the at least some of the first user data and the at least some of the second user data based on an overlap between the decrypted intersection data and the encrypted second user data.

24. A non-transitory computer readable medium storing computer executable instructions which, when executed by a computer, cause the computer to perform a method comprising:
  encrypting first user data with a first key to obtain encrypted first user data corresponding to a first set of users;
  transmitting the encrypted first user data to a device;
  receiving intersection data from the device, the intersection data based on the encrypted first user data and second user data corresponding to a second set of users;
  decrypting at least some of the intersection data with a second key to obtain decrypted intersection data;
  determining, based on the decrypted intersection data, an overlap between at least some of the first user data and at least some of the second user data, the overlap corresponding to users that are in both of the first set of users and the second set of users; and
  exchanging activity data with the device corresponding to the users that are in both of the first set of users and the second set of users.

* * * * *